(12) United States Patent
Ma

(10) Patent No.: US 10,428,549 B2
(45) Date of Patent: Oct. 1, 2019

(54) AWNING APPARATUS

(71) Applicant: Zhun-An Ma, Arcadia, CA (US)

(72) Inventor: Zhun-An Ma, Arcadia, CA (US)

(\*) Notice: Subject to any disclaimer, the term of this patent is extended or adjusted under 35 U.S.C. 154(b) by 139 days.

(21) Appl. No.: 15/476,766

(22) Filed: Mar. 31, 2017

(65) Prior Publication Data

US 2017/0284122 A1 Oct. 5, 2017

Related U.S. Application Data

(60) Provisional application No. 62/317,264, filed on Apr. 1, 2016.

(51) Int. Cl.
| | |
|---|---|
| *E04F 10/06* | (2006.01) |
| *E04H 15/08* | (2006.01) |
| *B60P 3/32* | (2006.01) |
| *E04F 10/04* | (2006.01) |
| *E04H 15/42* | (2006.01) |
| *E04H 15/48* | (2006.01) |

(52) U.S. Cl.
CPC ............... *E04H 15/08* (2013.01); *B60P 3/32* (2013.01); *E04F 10/04* (2013.01); *E04F 10/0622* (2013.01); *E04H 15/425* (2013.01); *E04H 15/48* (2013.01); *B60Y 2200/147* (2013.01)

(58) Field of Classification Search
CPC ....... Y10T 403/2221; Y10T 403/32861; F16B 7/044; F16B 7/0446; E04H 15/08; E04F 10/0622; E04F 10/0614; E04F 10/0618; E04F 10/0611
USPC ............ 160/70, 45, 69, 78, 79; 403/79, 150, 403/161, 53, 121
See application file for complete search history.

(56) References Cited

U.S. PATENT DOCUMENTS

| | | | |
|---|---|---|---|
| 272,339 A | * | 2/1883 | Shuman .................... F16D 3/40 464/136 |
| 1,389,002 A | | 8/1921 | Turner |
| 1,815,199 A | | 7/1931 | Goldberg et al. |
| 1,948,788 A | | 2/1934 | Goldberg et al. |
| 2,038,045 A | | 4/1936 | Heiser |
| 2,038,259 A | | 4/1936 | Anton |

(Continued)

FOREIGN PATENT DOCUMENTS

| | | |
|---|---|---|
| CH | 625300 | 9/1981 |
| CN | 105 083 143 | 11/2015 |

(Continued)

OTHER PUBLICATIONS

Partial European Search Report in Application No. EP 09 25 1792, dated Nov. 3, 2011 in 7 pages.

(Continued)

*Primary Examiner* — Johnnie A. Shablack
(74) *Attorney, Agent, or Firm* — Knobbe Martens Olson & Bear LLP

(57) ABSTRACT

An awning arm assembly is provided that includes inner and outer arms. A joint is provided that has an axle, e.g., any structure about which rotation can be provided coupled with one of the inner arm and the outer arm and a hollow body disposed about the axle. The hollow-body is coupled with the other of the inner arm and the outer arm. The hollow body is coupled with the axle such that when the outer arm moves relative to the inner arm the angle between the hollow body and the axle (and thereby the inner and outer arms) is adjusted.

18 Claims, 23 Drawing Sheets

(56) References Cited

U.S. PATENT DOCUMENTS

| | | |
|---|---|---|
| 2,144,827 A | 1/1939 | Anton |
| 2,679,289 A | 5/1954 | Loos |
| 2,740,470 A | 4/1956 | D'Azzo |
| 2,823,885 A | 2/1958 | Azzo |
| 2,942,291 A | 6/1960 | Flint |
| 3,188,035 A | 6/1965 | Owen |
| 3,782,443 A | 1/1974 | Clauss et al. |
| 3,923,074 A | 12/1975 | Mckee |
| 3,991,805 A | 11/1976 | Clauss |
| 4,077,416 A | 3/1978 | Lux |
| 4,183,687 A * | 1/1980 | Bramwell ............... F16C 39/02 403/11 |
| 4,214,621 A | 7/1980 | Wessels et al. |
| 4,469,159 A | 9/1984 | Lohausen |
| 4,479,526 A | 10/1984 | Rinaldi et al. |
| 4,566,516 A | 1/1986 | Lohausen |
| 4,590,642 A | 5/1986 | Hesener |
| 4,673,017 A | 6/1987 | Lauzier |
| 4,784,204 A | 11/1988 | Lohausen |
| 4,786,202 A | 11/1988 | Arnold et al. |
| 4,953,609 A | 9/1990 | Annin et al. |
| 5,029,363 A | 7/1991 | Hesener |
| 5,133,397 A | 7/1992 | Lohausen |
| 5,139,068 A | 8/1992 | Lohausen |
| 5,273,095 A | 12/1993 | Lukos |
| 5,307,856 A | 5/1994 | Murray |
| 2,214,371 A | 9/1994 | Heiser |
| 5,365,989 A | 11/1994 | Bodentien et al. |
| 5,394,921 A | 3/1995 | Lohausen |
| 5,752,556 A | 5/1998 | Steadman |
| 6,024,152 A | 2/2000 | Rosenich |
| 6,216,762 B1 | 4/2001 | Lin |
| 6,484,069 B2 | 11/2002 | Ab |
| 6,598,612 B1 | 7/2003 | Crowe |
| 6,637,717 B2 | 10/2003 | Li |
| 6,732,018 B2 | 5/2004 | Ab |
| 6,739,371 B2 | 5/2004 | Mukai |
| 6,763,874 B1 * | 7/2004 | Chen ..................... B60J 1/2055 160/370.22 |
| 6,820,673 B2 * | 11/2004 | Wessels ............... E04F 10/0611 160/56 |
| 6,874,558 B2 | 4/2005 | Mester |
| 6,904,826 B2 | 6/2005 | Hesener |
| 7,017,976 B1 * | 3/2006 | Rutherford ............ B60P 3/343 160/70 |
| 7,117,565 B2 * | 10/2006 | Brutsaert ............ E04F 10/0618 16/386 |
| 7,163,042 B2 | 1/2007 | Li |
| 7,179,009 B2 * | 2/2007 | Stimpfl ..................... B62D 1/20 403/53 |
| 7,367,376 B2 | 5/2008 | Forns |
| 7,371,180 B2 * | 5/2008 | Cymbal ................. F16D 3/265 403/161 |
| 7,451,797 B2 | 11/2008 | Forns |
| 7,628,194 B2 | 12/2009 | Wagner et al. |
| 7,645,088 B2 * | 1/2010 | Voss .................... E04F 10/0618 403/345 |
| 7,753,612 B2 | 7/2010 | Bouru et al. |
| 8,042,596 B2 | 10/2011 | Forns |
| 8,113,260 B2 | 2/2012 | Forns |
| 8,141,613 B2 | 3/2012 | Brutsaert |
| 8,205,656 B2 | 6/2012 | Ma |
| 8,316,910 B2 | 11/2012 | Popa et al. |
| 8,726,967 B2 | 5/2014 | Forns |
| 8,807,513 B2 | 8/2014 | Volin |
| 9,228,358 B2 * | 1/2016 | Hornung ............. E04F 10/0618 |
| 9,469,996 B2 | 10/2016 | Ma |
| 9,469,997 B2 | 10/2016 | Thompson |
| 10,006,206 B2 * | 6/2018 | Traub .................. E04F 10/0618 |
| 10,066,414 B2 * | 9/2018 | Ma ......................... E04H 15/08 |
| 2001/0027846 A1 | 10/2001 | Osinga |
| 2004/0016511 A1 | 1/2004 | Mester |
| 2006/0108819 A1 | 5/2006 | Wagner et al. |
| 2006/0230692 A1 * | 10/2006 | Llagostera Forns ........................ E04F 10/0611 52/74 |
| 2007/0051476 A1 | 3/2007 | Forns |
| 2007/0193700 A1 * | 8/2007 | Ornelas ............... E04F 10/0618 160/70 |
| 2007/0199662 A1 | 8/2007 | Miller |
| 2009/0301664 A1 * | 12/2009 | Llagostera Forns ........................ E04F 10/0622 160/79 |
| 2010/0032106 A1 | 2/2010 | Ma |
| 2012/0273144 A1 | 11/2012 | Forns |
| 2013/0118696 A1 | 5/2013 | Gavish |
| 2013/0126104 A1 | 5/2013 | Weber |
| 2013/0149023 A1 | 6/2013 | Wiecko |
| 2014/0251552 A1 * | 9/2014 | Ma .......................... E04F 10/04 160/45 |
| 2016/0102473 A1 * | 4/2016 | Ma .......................... E04H 15/08 160/70 |
| 2017/0284122 A1 * | 10/2017 | Ma .......................... B60P 3/32 |
| 2018/0320381 A1 | 11/2018 | Ma |

FOREIGN PATENT DOCUMENTS

| | | |
|---|---|---|
| DE | 2613583 | 3/1976 |
| DE | 2743748 | 4/1979 |
| DE | 31 10336 | 2/1982 |
| DE | 199 49 215 | 4/2001 |
| EP | 0 119 550 | 9/1984 |
| EP | 1342864 | 9/2003 |
| EP | 2 071 982 | 6/2009 |
| EP | 2 565 343 | 3/2013 |
| FR | 2163097 | 7/1973 |
| FR | 2564521 | 11/1985 |
| JP | S62-146828 | 9/1987 |
| WO | WO 1998/001638 | 1/1998 |
| WO | WO 2010/063386 | 6/2010 |

OTHER PUBLICATIONS

Extended European Search Report in Application No. EP 09 25 1792, dated Feb. 2, 2012 in 11 pages.

Extended European Search Report issued in European Application No. 14158518.2, dated May 16, 2014 in 9 pages.

Extended European Search Report issued in European Application No. 17020130.5, dated Jul. 11, 2017 in 8 pages.

* cited by examiner

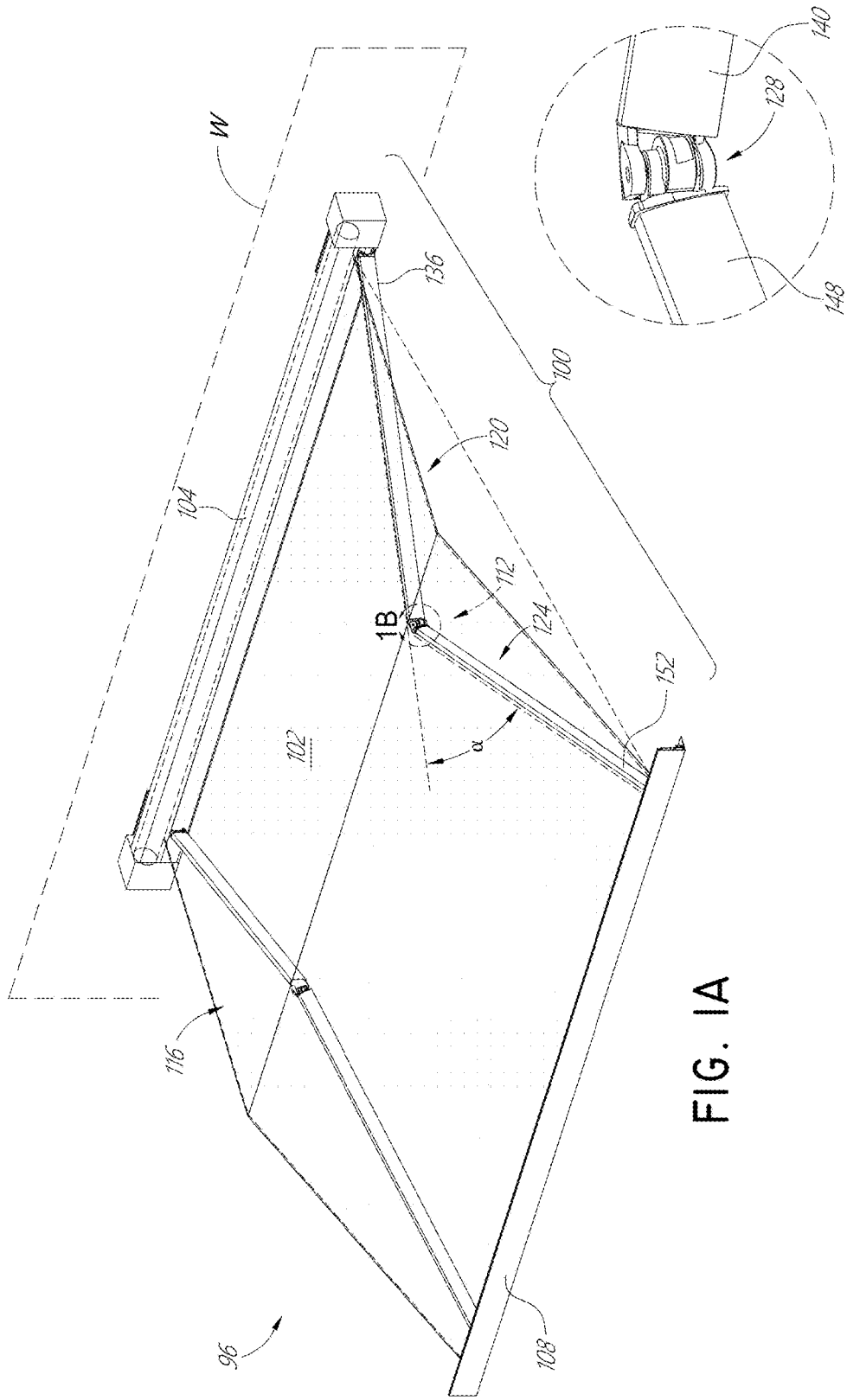

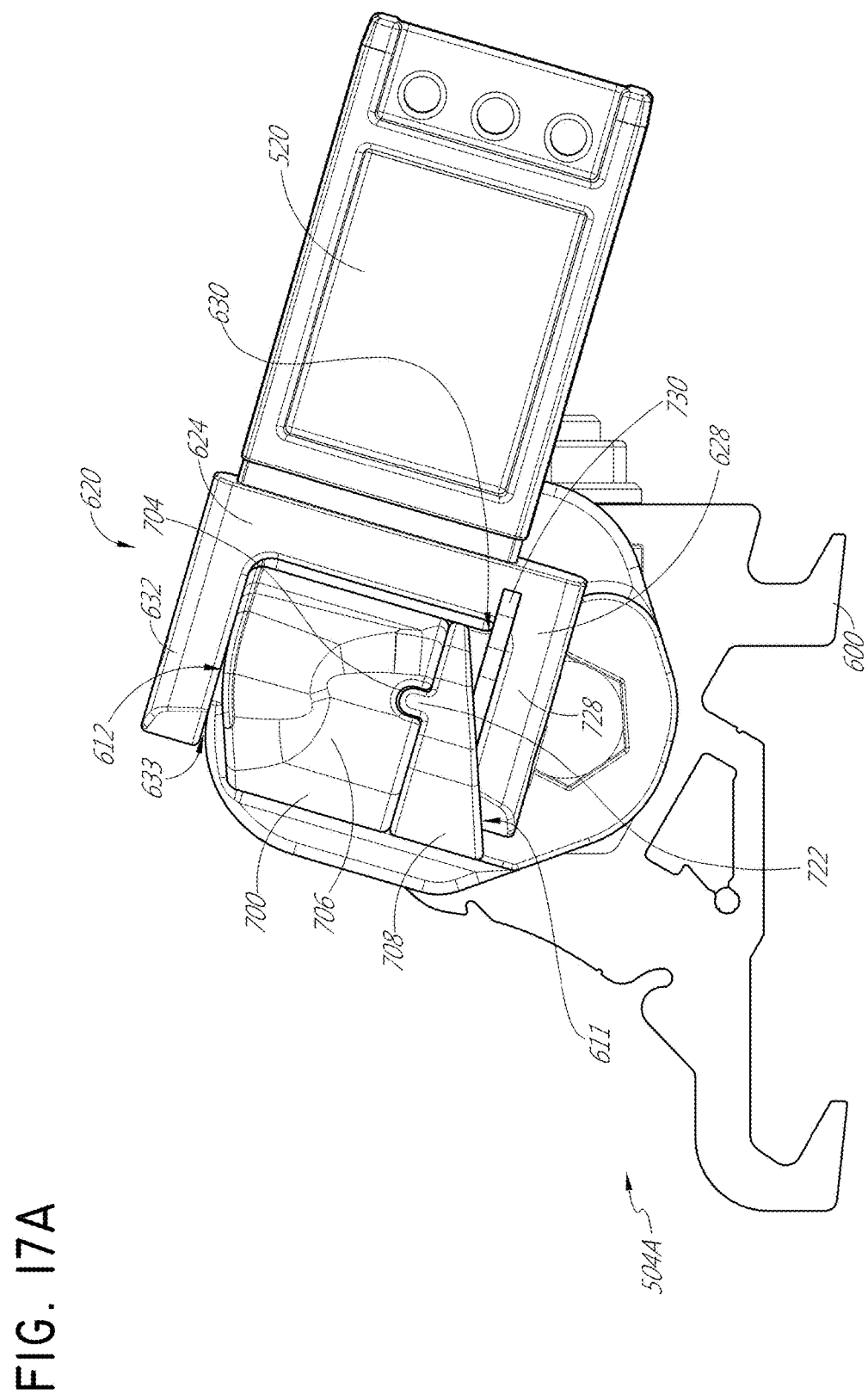

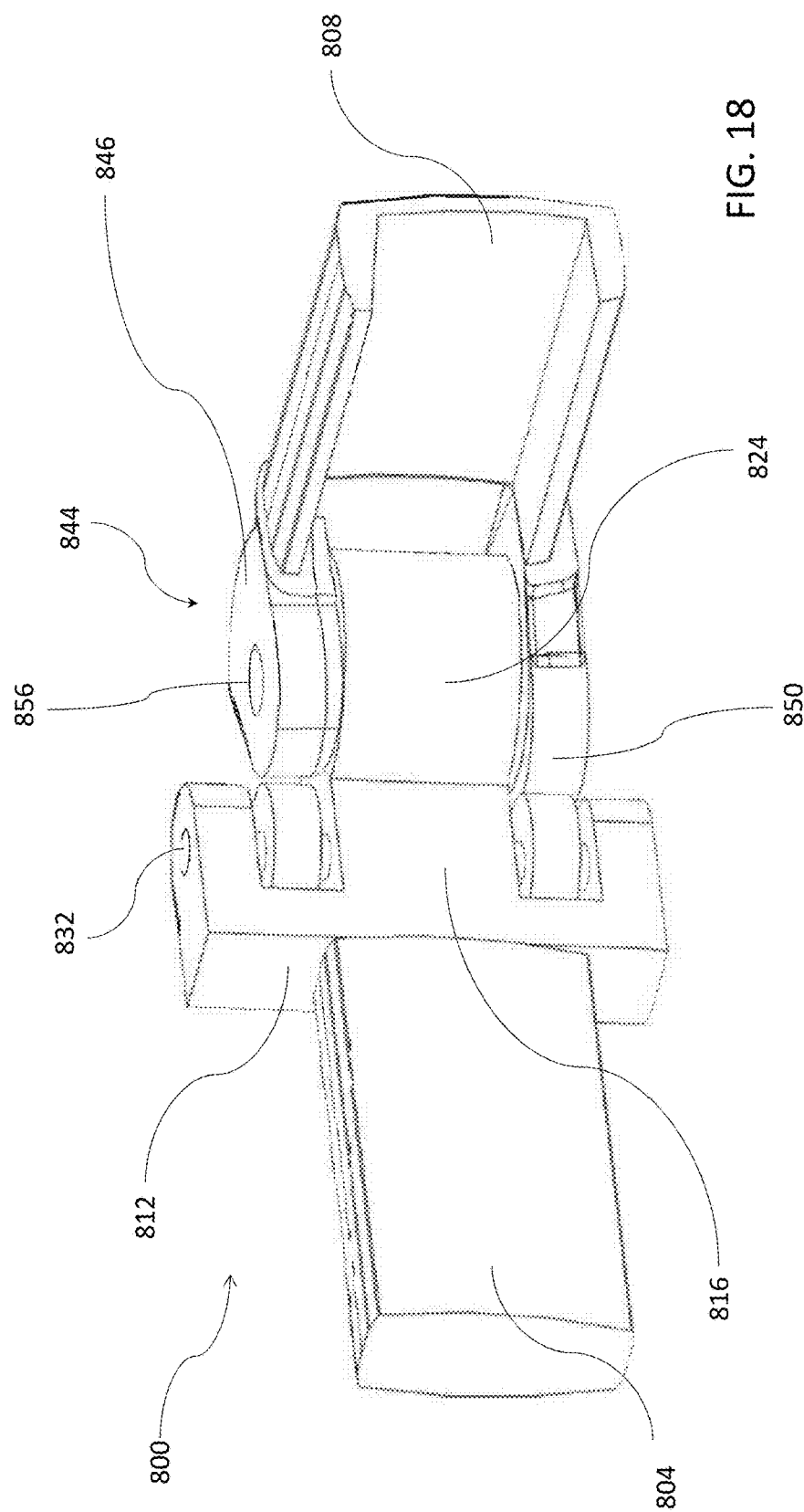

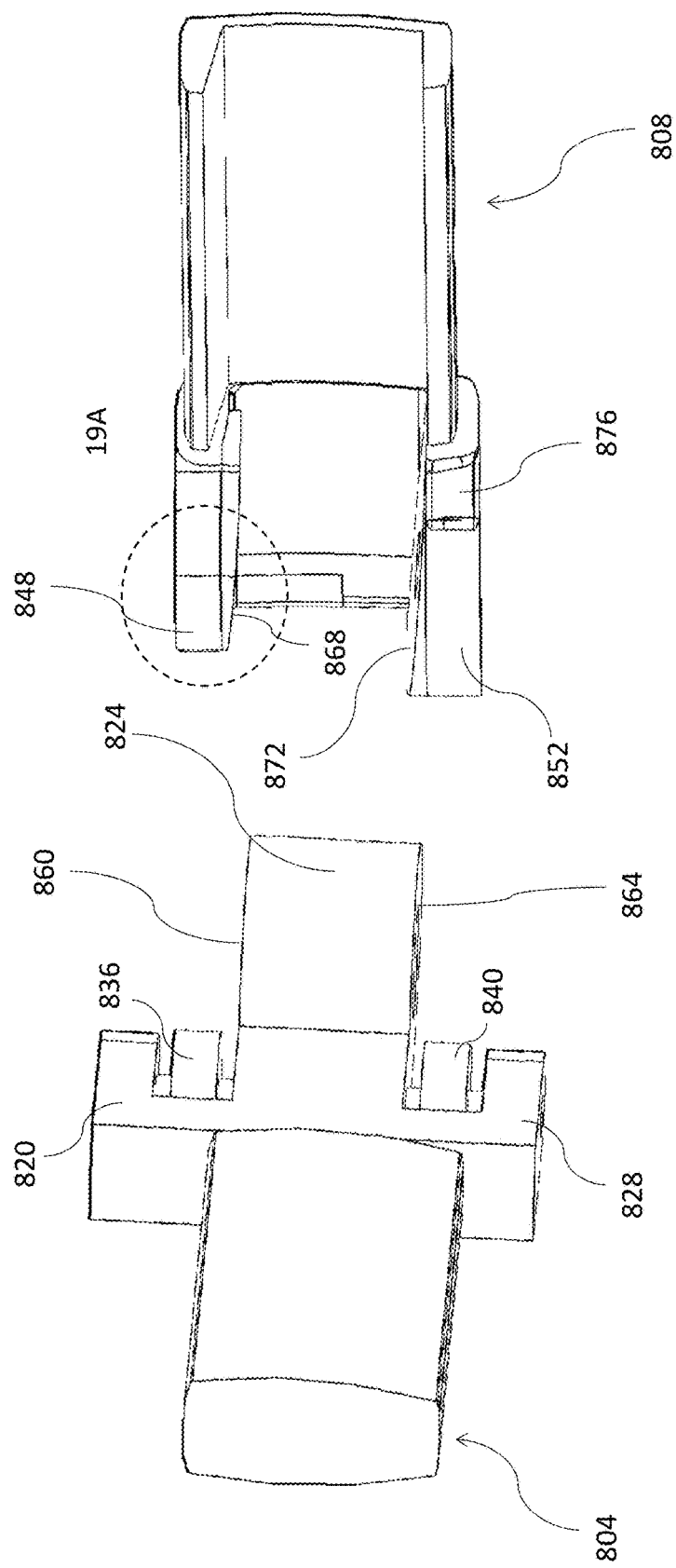

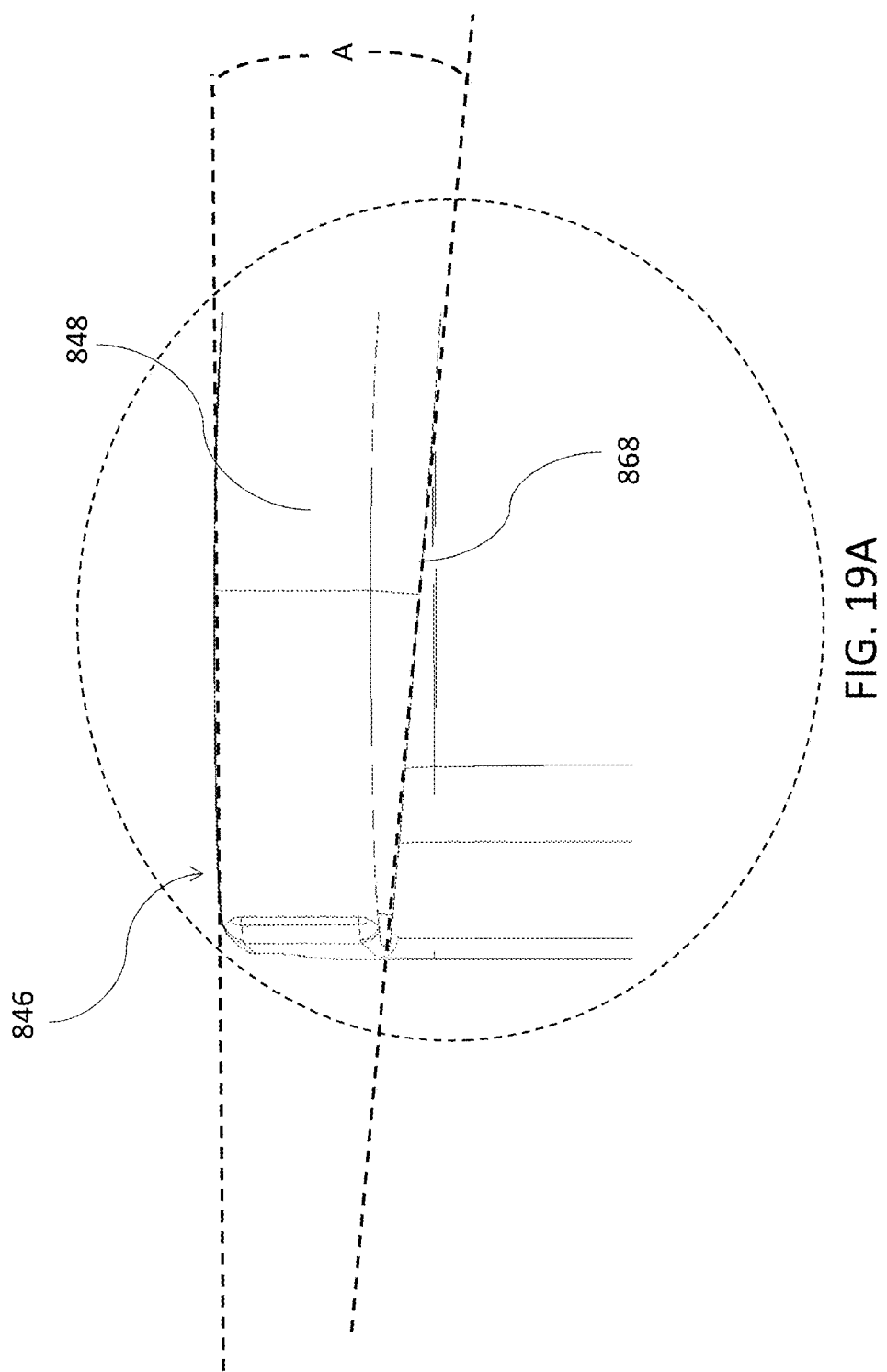

AWNING APPARATUS

INCORPORATION BY REFERENCE TO ANY PRIORITY APPLICATIONS

This application claims priority to U.S Provisional App. No. 62/317264 filed Apr. 1, 2016, the entirety of which is hereby incorporated by reference under 37 CFR 1.57.

BACKGROUND OF THE INVENTION

Field of the Invention

This application is directed to awnings, which are used to provide shelter in an extended configuration and which can be folded to a compact retracted configuration.

Description of the Related Art

During certain hours, days, and/or seasons, the shade and shelter of an awning may be desirable. Further, at sometimes one may desire to remove an awning to enjoy the sunshine or for practical concerns such as to provide clearance for maintenance or to prevent damage to the awning during extreme weather. Accordingly, a retractable awning is desirable. Further, at times it may be desirable to have an adjustable awning, allowing the awning to be positioned as desired.

Awning supports have been developed to provide a retractability and adjustability. However, such awnings may not provide convenient shading or sheltering shape and clearance. While some awnings are configured to provide enhanced shade and clearance, such awnings are generally complex in construction, making them difficult to manufacture and with too many parts susceptible to wear. Thus, there is a need for an improved adjustable awning support.

SUMMARY OF THE INVENTION

Disclosed herein are embodiments of awnings that have improved clearance and shade characteristics. The awnings can be made with relatively few components such that they are easier to manufacture and use and also less susceptible to wear.

In one embodiment, an awning assembly is provided that has a support member for mounting to a wall or other support, a front bar, and an arm assembly. The arm assembly is configured to be disposed in a retracted position and in an extended position. The arm assembly includes a first arm, a second arm, and a joint disposed between first arm and the second arm. The first arm has a first end pivotably coupled with the support member and a second end disposed away from the support member when the arm assembly is in the extended position. The second arm has a first end and a second end. The second end of the second arm is coupled with the front bar. The joint has a first member coupled with the second end of the first arm and a second member coupled with the first end of the second arm. The joint includes an axle coupled with the first member, a spherical surface disposed about the axle, and a through-hole disposed in or coupled with the second member. The through-hole is disposed about and spaced away from the axle by the spherical surface.

In another embodiment, an awning assembly for mounting to a wall or other support has an arm assembly. The arm assembly is configured to be disposed in a retracted position and an extended position. The arm assembly includes a first portion and a second portion. The first portion has a first end configured to be disposed adjacent to the wall or support and a second end configured to be disposed away from the wall or support when the arm assembly is in the extended position. The second portion has a first end and a second end. The first end of the second portion is disposed adjacent to the second end of the first portion. The second end of the second portion is disposed away from the first end of the second portion. The awning assembly also includes a joint that has an axle disposed between the first portion and the second portion of the arm assembly. The joint also has a first contact surface coupled with the first portion and a second contact surface coupled with the second portion. The first and second portions of the arm assembly are disposed at an acute angle in the extended position. In some cases sliding of the second contact surface over the first contact surface in a first direction causes the first and second portions of the arm assembly to be aligned in the retracted position. In some cases sliding of the second contact surface over the first contact surface in a second direction opposite the first direction causes the first and second portions of the arm assembly to be disposed at the acute angle in the extended position.

In another embodiment, an awning arm assembly is provided that includes an inner arm and an outer arm. The inner arm has an inner end and an outer end. The outer arm has an inner end and an outer end. A joint is provided that has an axle coupled with one of the inner arm and the outer arm and a hollow body disposed about the axle. The hollow body is coupled with the other of the inner arm and the outer arm in a manner providing no relative movement between the hollow body and the arm with which the hollow body is coupled. The hollow body is coupled with the axle such that when the outer arm moves relative to the inner arm the angle between the inner arm and the outer arm is adjusted. Such movement can also cause motion of the hollow body about the axle. The movement of the hollow body about the axle can include two or more degrees of freedom.

In another embodiment, a joint for an awning arm assembly is provided. The joint that is provided has an axle, e.g., any structure about which rotation can occur, coupled with one of an inner portion and an outer arm and a hollow body disposed about the axle. The hollow body is coupled with the other of the inner portion and the outer portion. The hollow body is coupled with the axle such that when the outer portion moves relative to the inner portion, the angle between the hollow body and the axle (e.g., between longitudinal axes thereof) can be adjusted. Such adjustment can result in the angle between the inner portion and the outer arm being adjusted.

A joint disclosed herein can have an axle or axle assembly with a radially enlarged section about which a hollow body of the joint can tilt. The enlarged section can include a spherical surface. For example, a sphere or ball can be mounted or formed on the axle. Movements, such as tilting of the hollow body, can be controlled by one or more contact surfaces disposed on the outside of the hollow body. For example, one or a plurality of (e.g., two) contact surfaces can be coupled with the hollow body. One or a plurality of (e.g., two) contact surfaces can be coupled with the axle.

In some embodiments, a joint for controlled complex motion of an arm provides a hollow body disposed about an axle. The hollow body is able to tilt relative to the axle. A control surface disposed inside the hollow body at least partially guides the tilting motion of the hollow body about the axle. The control surface can be spherical or partly spherical, and can include a pair or spherical or partly spherical surfaces in some embodiments. In some embodiments, one or a plurality of contact surfaces disposed outside hollow body is or are configured to at least partially guide the tilting of the hollow body.

In further embodiments, an awning arm assembly is provided that includes an arm and a joint. The arm has an inner end and an outer end. The joint has an axle coupled with the arm and a hollow body disposed about the axle. The hollow body is configured to be coupled with another component of the awning assembly. The hollow body and other component can be coupled in a manner providing no relative movement between the hollow body and the other component of the assembly with which the hollow body is coupled. The hollow body is coupled with the axle such that when the arm moves relative to the other component the angle between the arm and the other component in each of two planes is adjusted.

In one embodiment, an awning arm assembly is provided that includes a rooftop mount structure, an arm, and a joint. The awning arm assembly may be configured to attach to a vehicle at or above a mounting elevation, for example with the rooftop mount structure. The arm has an inner end and an outer end. The inner end of the arm includes a first surface. The joint has an axle, a hollow body, and a channel. The axle can be coupled with the arm at the inner end. The axle extends along an axis. The hollow body includes a second surface. The hollow body is disposed about the axle. The hollow body may be coupled with the rooftop mount structure in a manner providing no relative movement between the hollow body and the rooftop mount structure.

In some embodiments, a degree of adjustability is provided between the hollow body and the rooftop mount structure. In such embodiments, once the desired position or orientation of the hollow body is provided, the hollow body can be secured to the rooftop mount structure in a manner providing no relative movement. In other embodiments, little to no adjustability is provided. Once attached to the rooftop mount structure, the hollow body is fixedly connected to the rooftop mount structure.

At least upon full assembly, the axle is disposed in the channel. The channel has a first end and a second end and extends between the first and second ends along an axis. The axis along which the channel extends is disposed at a non-zero angle to the axis along which the axle extends. The channel is larger at the first and second ends than it is at a point along the channel between the first and second ends. This shape of the channel allows the axle to move relative to the channel about the axis located between the first and second ends of the channel. The hollow body is coupled with the axle such that when the arm moves relative to the hollow body an angle between the arm and the rooftop mount structure is adjusted.

One or more control surfaces may be provided to direct the movement and change of angle. For example, first and second surfaces can be disposed at the first end of the channel. The first and second surfaces are configured to contact each other and to slide past each other when the arm rotates about the axis of the axle. The first and second surfaces may be shaped to permit an increasing degree of tilt of the axle relative to the channel as the arm rotates about the axis of the axle. When the arm moves relative to the rooftop mount structure, the outer end of the arm travels along an arcuate, e.g., a radial path, creating a distance in a horizontal direction between the outer end of the arm and the rooftop mount structure. The joint may be configured such that when the arm moves relative to the roof mount structure, the outer end of the arm remains at or above a first elevation until after the horizontal distance is equal to a clearance distance. The first elevation may be a clearance elevation, e.g., a height above which the outer end remains to avoid striking a portion of the rooftop. The clearance distance may be a distance from a rooftop mount structure to a portion of the rooftop or vehicle that the outer end is to avoid.

In another embodiment, an awning arm assembly is provided. The awning arm assembly has a mount structure, an arm, and a joint. The mount structure may be configured to attach to a vehicle rooftop. The arm has an inner end and an outer end. The inner end of the arm includes a first control surface. The joint is disposed between the mount structure and the arm. The joint includes an axle, a hollow body, and a channel. The axle is coupled with the inner end of the arm. The axle extends along a longitudinal axis. The hollow body includes a second control surface. The hollow body is disposed about the axle. The hollow body is coupled with the mount structure in a manner providing no relative movement between the hollow body and the mount structure. In this context, providing no relative movement can refer to a condition after any adjustments between the hollow body and the mount structure are provided. No relative movement can also refer to assemblies where the hollow body has only one position when attached to the mount structure. In some embodiments, the hollow body is part of or is coupled with the arm and the axle is coupled with the mount structure. In such embodiments, the horizontal and vertical positions of the axle are fixed, though the axle may rotate in some arrangements. The channel extends along a longitudinal axis. The axle is disposed in the channel. The channel has a first end and a second end.

The channel has an inner perimeter at one or both of the first and second ends that is larger than the outer perimeter of the axle. The inner perimeter of the channel is large enough to provide a space at one or both of the first and second ends in which the axle may move within the channel. The inner perimeter of the channel may be at least twice as large as the perimeter of the axle. In some embodiments, the inner perimeter of the channel is about two times larger and up to as much as four times larger than the perimeter of the axle. In some cases, the largest width of the channel as measured transverse to the longitudinal axis of the channel is at least about twice the diameter of the axle. In some cases, the largest width of the channel as measured transverse to the longitudinal axis of the channel is at least about three to about six times the diameter of the axle. In some cases, the smallest width of the channel as measured transverse to the longitudinal axis of the channel is at least about fifty percent larger than the diameter of the axle. The first and second control surfaces may be configured such that when the arm moves relative to the hollow body, the first and second control surfaces cause an angle between the longitudinal axis of the arm and the longitudinal axis of the channel to be adjusted.

In some embodiments, the first and second control surfaces are shaped to increase an angle between the longitudinal axis of the channel and the longitudinal axis of the axle as the arm moves relative to the hollow body.

In other embodiments, the joint is configured such that when the arm moves relative to the hollow body, the outer end of the arm remains at or above a clearance elevation until after the arm has moved a clearance distance in a horizontal direction.

In another embodiment, an awning arm joint is provided. The awning arm joint has an arm end member, an axle assembly, and a hollow body. The arm end member includes a first fork portion, a second fork portion, and an arm end control facet. The axle assembly is coupled with the first fork portion and the second fork portion. The hollow body includes a channel. The channel of the hollow body is disposed about the axle assembly. At least two hollow body control facets are disposed at one end of the channel. A first gap is defined between an inner periphery of the channel and an outer periphery of the axle assembly adjacent to the hollow body control facets. A second gap is defined between the inner periphery of the channel and an outer periphery of the axle assembly at a location spaced away from the hollow body control facets. The second gap is less than the first gap and the arm end control facet is disposed over a first hollow body control facet when the joint is folded. The first gap is less when the joint is extended then when the joint is folded. The arm end control facet is disposed over a second control facet when the joint is extended.

In another embodiment, an awning arm joint is provided. The awning arm joint includes an arm end member, an axle, and a hollow body assembly. The arm end member has a first fork portion and a second fork portion. The axle is coupled with the first fork portion and the second fork portion. The axle may be an axle assembly in some examples. The hollow body assembly has a hollow body defining a channel disposed about the axle or axle assembly and a wear-resistant member. The wear-resistant member can be a cap in some embodiments. The cap can comprise a first side coupled with the hollow body and a second side disposed opposite the first side. The second side can be disposed adjacent to one of the first fork portion and the second fork portion.

According to another embodiment, an awning assembly is provided that has a support member for mounting to a wall. The awning assembly also has a front bar and an arm assembly. The arm assembly is configured to be disposed in a retracted position and in an extended position. The arm assembly includes a first arm, a second arm, and a joint. The first arm has a first end pivotably coupled with the support member and a second end disposed away from the support member when the arm assembly is in the extended position. The second arm has a first end and a second end. The second end is coupled with the front bar. The joint is disposed between first arm and the second arm. The joint has a first member coupled with the second end of the first arm and a second member coupled with the first end of the second arm. The joint includes an axle, a spherical surface, a hollow tubular body, and a roller. The axle is coupled with the first member. The spherical surface is disposed about the axle. The hollow tubular body is disposed in or coupled with the second member and is disposed about and spaced away from the axle by the spherical surface. The roller is disposed on one of the first member and second member. The roller is disposed to be in rolling contact with a guide surface of the other of the first member and the second member. In some embodiments, as the arm assembly moves from the retracted position to the extended position tilting of the hollow body relative to the axle is controlled by the motion of the roller over the guide surface such that the second arm rotates and tilts relative to the first arm.

In one variation, the joint has a groove disposed within the hollow body. The groove is configured to be disposed about a circumference of the spherical surface. In some embodiments, the groove comprises a radius of curvature matching the radius of curvature of the spherical surface. The groove can have a height along the longitudinal axis of the axle that is less than about ¼ the diameter of the spherical surface. In some embodiments, a first portion of the hollow body has a diameter less than the diameter of the spherical surface and a second portion of the circular hollow body has a diameter equal to or greater than the diameter of the spherical surface.

In another embodiment, an awning arm assembly has an arm and a joint. The arm has an inner end and an outer end. The joint has an axle and a rolling guide. The axle of the joint is coupled with the arm and a hollow body disposed about the axle. The hollow body is configured to be coupled with another component of the awning assembly in a manner providing no relative movement between the hollow body and the other component of the assembly with which the hollow body is coupled. The rolling guide of the joint is journaled about an axis. One or both of the rolling guide and the axis move or moves with the hollow body. Motion of the rolling guide is controlled by a contact surface of the joint. The hollow body is coupled with the axle such that when the arm moves relative to the other component, the angle between the arm and the other component in each of two planes is adjusted.

In a further embodiment, an awning arm joint is provided that includes an arm end member, an axle, a hollow body, a guide surface, and a rolling guide. The arm end member has a first fork portion and a second fork portion. The axle is coupled with the first fork portion and the second fork portion. The hollow body has a hollow body defining a channel disposed about the axle. The guide surface is disposed adjacent to the axle or to the hollow body. The rolling guide is in contact with the guide surface. As the arm joint unfolds from a folded state, rolling contact between the rolling guide and the guide surface causes the hollow body to rotate about and tilt relative to the axle.

In some embodiments, an awning assembly for mounting to a surface is provided that includes a mount structure configured to attach to a surface and an arm that has an inner end and an outer end. The awning assembly can have any of the awning arm joints disclosed herein. The awning arm joint can be disposed between the mount structure and the arm. The inner end of the arm can be disposed adjacent to the awning arm joint.

In some embodiments, an awning assembly is provided that includes a support member for mounting to a wall, a front bar, a first arm, a second arm, and any awning arm joint disclosed herein. The awning arm joint can be disposed between the first arm and the second arm. One of the first and second arms can be disposed adjacent to the support member. The other of the first and second arms can be disposed adjacent to the front bar.

BRIEF DESCRIPTION OF THE DRAWINGS

These and other features, aspects and advantages are described below with reference to the drawings, which are intended to illustrate but not to limit the inventions. In the drawings, like reference characters denote corresponding features consistently throughout similar embodiments.

FIG. 1A is a perspective view of an awning in a partially deployed state;

FIG. 1B is a detail view of a portion of an arm assembly focusing on a joint provided between two arm portions;

FIG. 17A is a side view of an awning arm assembly comprising a hollow body assembly;

FIG. 17B-1 is a top view of the engagement cap of FIG. 17B;

FIG. 17B-2 is a side view of the engagement cap of FIG. 17B;

FIG. 18 is a perspective inside view of a joint of an awning arm assembly;

FIG. 19 is a partial exploded view of the joint of FIG. 18; and

FIG. 19A is a detail view of a lobe of the joint of FIGS. 18 and 19.

DETAILED DESCRIPTION OF THE PREFERRED EMBODIMENT

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein. Each and every feature described herein, and each and every combination of two or more of such features, is included within the scope of the present invention provided that the features included in such a combination are not mutually inconsistent.

Figure 1:
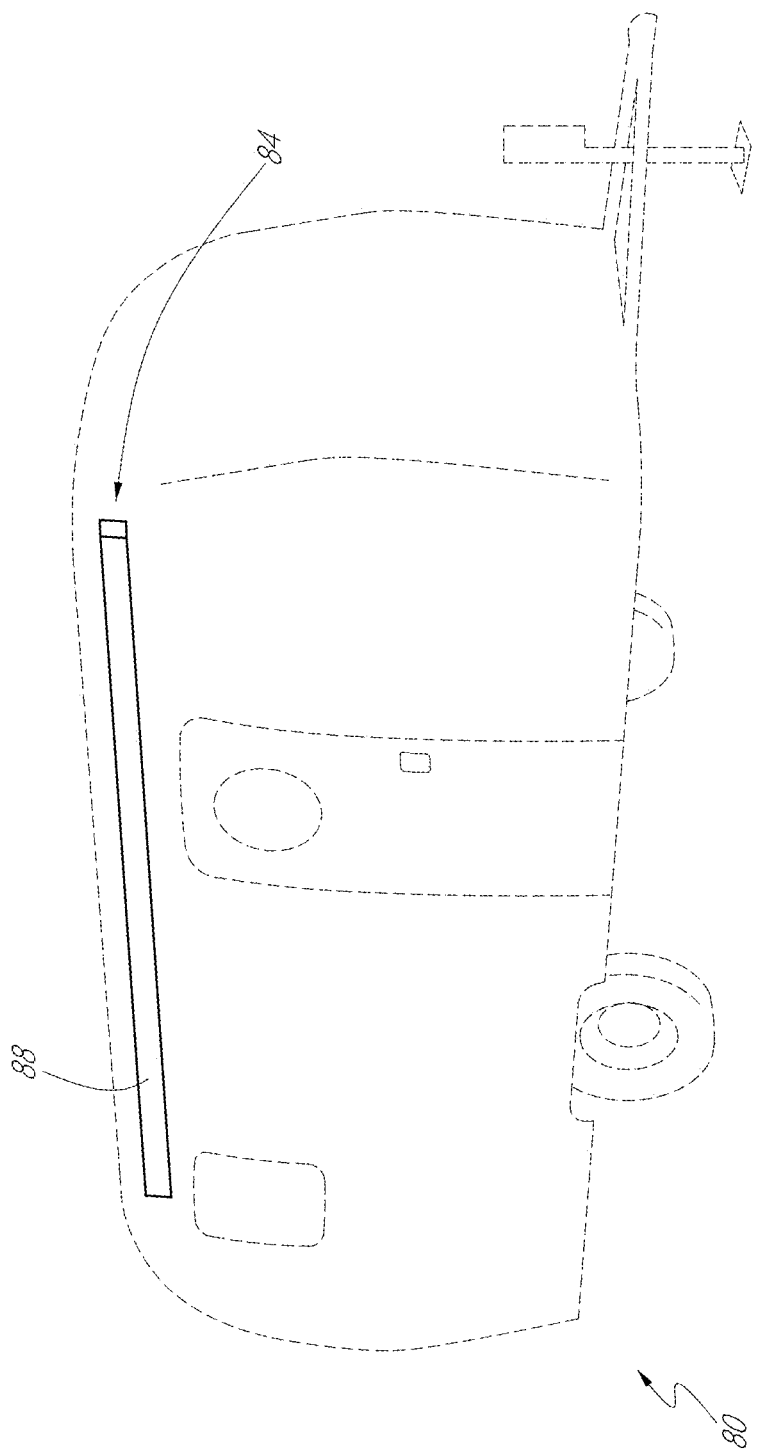
FIG. 1 is a side view of an example vehicle with an awning mounted thereto, the awning in a returned state.

FIG. 1 shows an example vehicle 80 on which an awning 88 is mounted. The vehicle 80 includes a rooftop portion 84. As illustrated, the awning 88 is in a folded position. When the awning 88 is in a folded position, it does not provide shelter. The folded position is optimal for storage, such as during travel. The awning 88 may include the features of either or both the awnings 96, 500 as described below. In some embodiments, features of both of the awnings 96, 500 may be used simultaneously in the same system.

In some embodiments, the awning 88 is configured to attach to the vehicle 80 at the rooftop portion 84 at or above a first elevation or distance in a vertical direction. The rooftop portion 84 may include a permanent structure, e.g., a rack, to which the awning 88 may be attached.

In other embodiments, the awning 88 is configured to attach to a lateral surface or support structure of the vehicle 80, such as an outer wall or to a wall of a fixed structure such as a residence or commercial building. For example, the awning 88 may be configured to attach to the vehicle 80 or to a wall W illustrated schematically in FIG. 1A.

I. Awning Arm Assembly Joints Disposed Between Multiple Moving Arm Components

FIG. 1A shows one embodiment of an awning 96 that provides shelter. The awning 96 includes an awning assembly 100 and a cover 102. The awning assembly 100 has a support member 104, a front bar 108, and an arm assembly 112. The cover 102 spans a gap between the arm assembly 112 and another arm assembly 116 spaced apart from the arm assembly 112. The arm assemblies 112, 116 preferably operate under the same or similar principles as discussed below, whereby a motion is provided for at least an outer portion thereof in both a horizontal plane and a vertical plane. The horizontal and vertical motions enable the portions of the arm assemblies 112, 116 farthest from the support member 104 to be disposed at an elevation below the portions of the arm assemblies 112, 116 adjacent to the support member 104. The lower elevation of the portion of the arm assemblies 112, 116 farthest from the support member 104 can be provided in any suitable configuration, for example with a generally horizontally disposed inner arm or portion and a downwardly angled outer arm or portion. FIG. 1A shows an angle a disposed between an outward projection of the longitudinal axis of the arm 120 and the longitudinal axis of the arm 124. An inflection point or line can be provided between the inner and outer arms or portions. The inflection point or line can define an angle a between an outward portion of the cover 102 and an inward portion of the cover 102. The downward angle of the outer arm provides better shade under a wider variety of conditions than if the arm assemblies 112, 116 and cover are generally horizontally disposed. By disposing an inflection point in a middle portion of the cover 102, e.g., just inward of the downward angled arm, the headroom or clearance beneath the cover at a location adjacent to the support member 104 is made higher to accommodate more users.

The support member 104 can take any suitable form, for example having one or more mounts for securing the awning assembly 100 to a support structure such as a wall W of a building or an outside portion of a mobile home or other support structure, including a vehicle. The support member 104 can have or be coupled with other functional components of the awning 96, e.g., a device such as a roller for rolling up or otherwise gathering the cover 102 when the awning 96 is retracted. The support member 104 can also have a compact configuration wherein at least one component is disposed above the other. For example, an upper region can have a roller for gathering the cover 102 and a lower region into which the arms assemblies 112, 116 can be folded as discussed below. In the illustrated embodiment, a housing is provided on each side of the support member 104, in which a roller is journaled and in which an end of each of the arms assemblies 112, 116 is supported for pivotal movement.

The arm assembly 112 is configured to be disposed in an extended position, e.g., as shown in FIG. 1A. The arm assembly 112 can be disposed in a retracted position (not shown). The arm assembly 112 includes a first arm 120, a second arm 124, and a joint 128 disposed between first arm 120 and the second arm 124.

The first arm 120 has a first end 136 pivotably coupled with the support member 104 and a second end 140 disposed away from the support member 104 when the arm assembly 112 is in the extended position. The second arm 124 has a first end 148 and a second end 152. The second end 152 of the second arm 124 is coupled with the front bar 108. In one embodiment, the first and second arms 120, 124 are each hollow, elongate members that extend along generally straight longitudinal axes, though curved members are also possible. Solid members are also possible.

FIG. 1B shows connection of the first and second arms 120, 124 with the joint 128. Specifically the second end 140 of the first arm 120 is disposed at the joint 128 and can be joined thereto in a suitable fashion. For example, the second end 140 can be hollow or have a recess configured to receive a portion of the joint 128. Similarly the first end 148 of the second arm 124 can be hollow or have a recess configured to receive a portion of the joint 128. FIG. 1B shows that as the arms 120, 124 fold toward each other to the retracted state, the outer surfaces of the arms 120, 124 are brought into adjacency.

Figure 3:
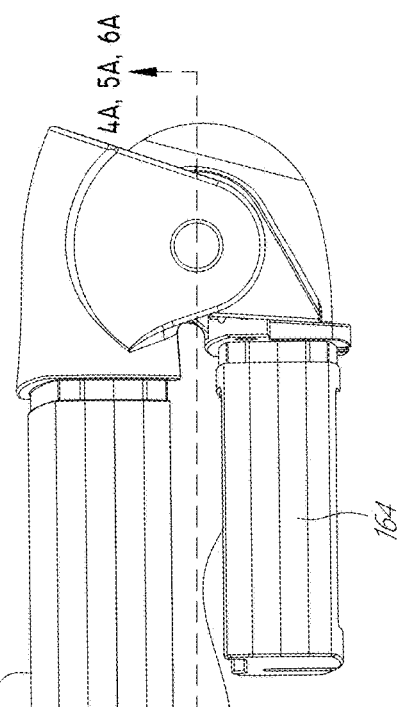
FIG. 3 is a top view of the joint of FIG. 2.
Figure 2:
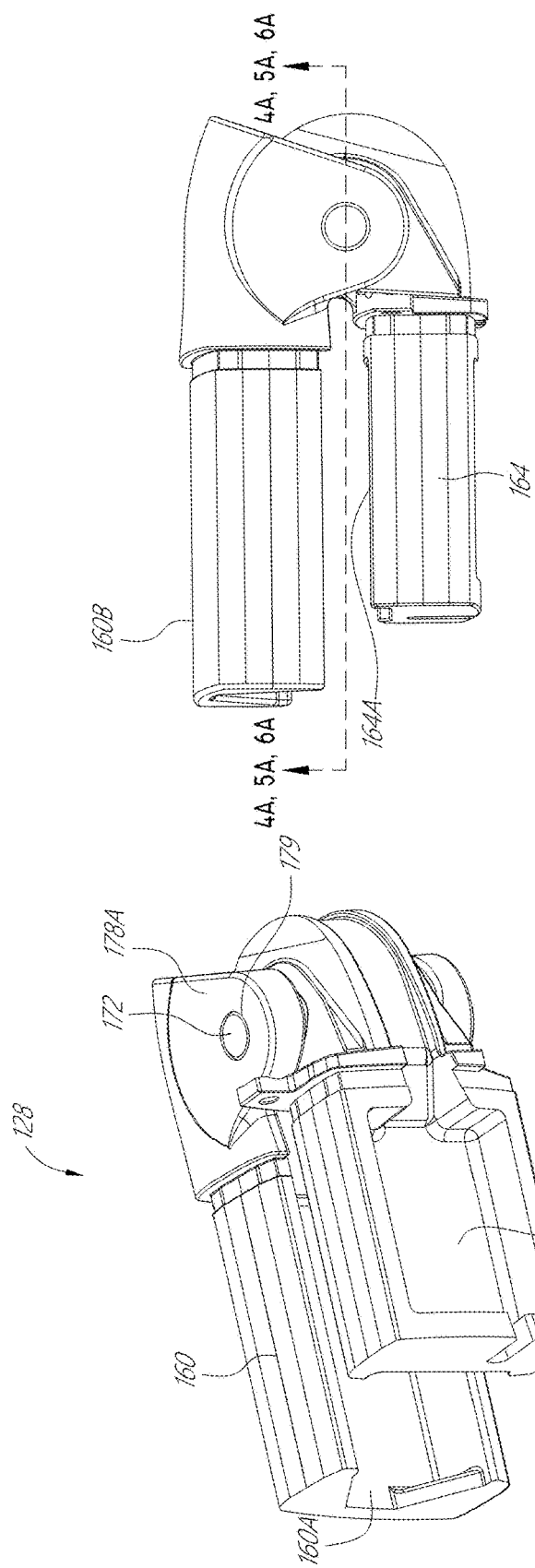
FIG. 2 is a perspective inside view of a joint of an arm assembly of the awning of FIG. 1A in a retracted state.
Figure 7:
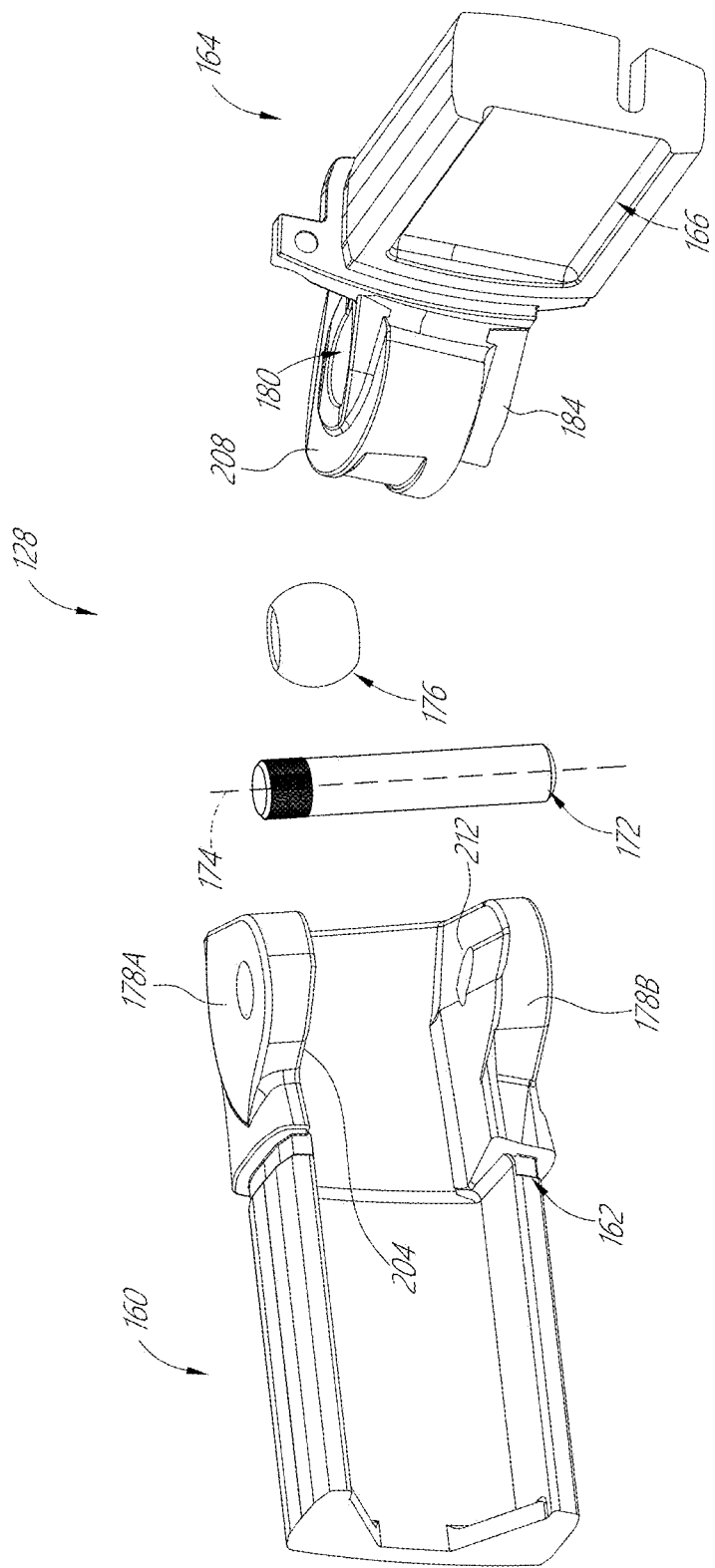
FIG. 7 is an exploded view of the joint of FIG. 2.

FIGS. 2, 3, and 7 show more details of the joint 128, which includes a first member 160 and a second member 164. The first member 160 has an end 162 (see FIG. 7) configured to couple with the second end 140 of the first arm 120. The second member 164 has an end 166 (see FIG. 7) configured to couple with the first end 148 of the second arm 124. The arms 120, 124 are not shown in FIG. 2, 3, or 7 but a hollow aspect or recess of the arms 120, 124 is disposed over the ends 162, 166 of the members 160, 164 respectively in one embodiment. The first and second members 160, 164 are shown in a compact, folded state in FIGS. 2 and 3. FIG. 3 shows that the joint 128 provides a bight in the folded state. The bight is formed two sides 160A, 164A and a joined portion of the joint 128. The two sides 160A, 164A are outward facing sides of the joint 128 as illustrated in FIG. 1B. Inward facing portions 160B, 164B of the joint 128 are disposed outside the bight in the folded state as shown in FIGS. 2 and 3.

The first and second members 160, 164 can be configured to generally fill a portion of or an inside profile of one or both of the first and second arms 120, 124. FIG. 2 shows that the first member 160 can have a C-shaped profile in which the top and bottom segments can be sized to slide into and substantially fill upper and lower regions of an inside hollow portion of the first arm 120. A lateral portion of the end 162 of the first member 160 is disposed between lateral sides of the upper and lower regions. The second member 164 can have an I-shaped profile as shown in FIG. 2. The I-shaped profile can provide for an expanse of the second member 164 disposed between top and bottom portions of the second member 164 to also be spaced from lateral edges of the top and bottom of the second member 164. The top and bottom segments of the second member 164 can be sized to slide into and substantially fill upper and lower regions of an inside hollow portion of the second arm 124. The C- and I-shaped profiles can be switched such that the first portion 160 has an I-shaped profile and the second portion 164 has a C-shaped profile or both can have C- or I-shaped profiles. Other profiles are also possible as is providing a solid insert complete matching the inner periphery of the arms 120, 124. The C- and I-shaped profiles provide an improved strength/weight ratio over an oblong cross-section matching the inside profile of the arms 120, 124.

Figure 4A:
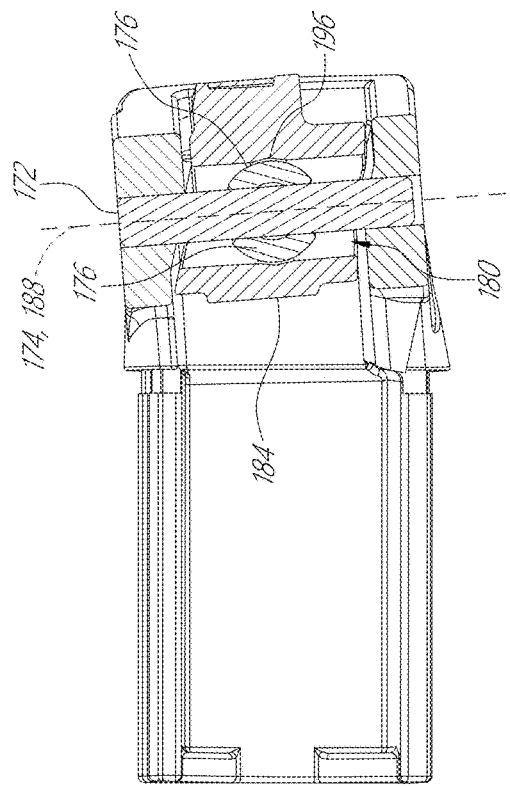
FIG. 4A is a cross-sectional view of the joint illustrated in FIG. 3 in the retracted state of FIG. 4, the section plane taken through 4A-4A.
Figure 8:
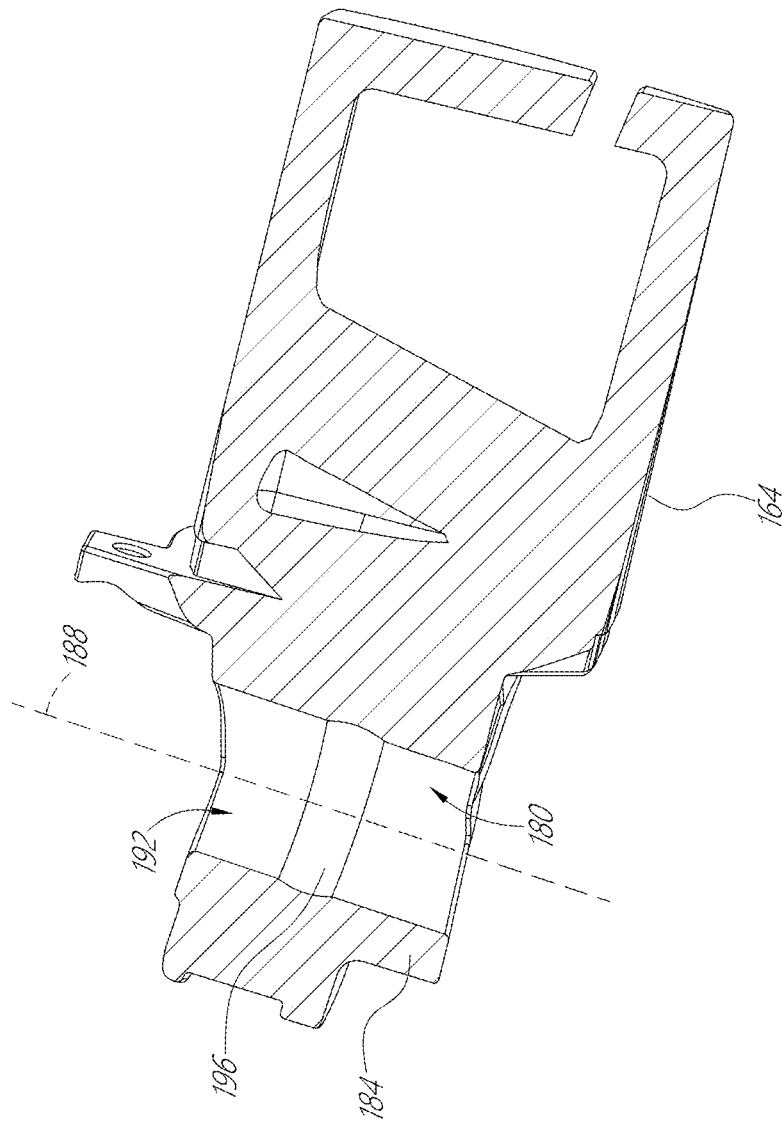
FIG. 8 is a cross-sectional view of a portion of the joint illustrated in FIG. 2.

FIGS. 7 and 8 show further structures of one embodiment of the joint 128. The joint 128 can include an axle 172 and a spherical surface 176 disposed about the axle 172. The axle 172 and the spherical surface 176 form an axle assembly. The axle 172 is coupled with the first member 160. The first member 160 can have an upper lobe 178A and a lower lobe 178B coupled with and projecting away from the end 162. The lobes 178A, 178B can each have an aperture 179 to receive a portion of the axle 172 for mounting the axle 172. A through-hole 180 is disposed in or coupled with the second member 164. FIG. 4A shows that the through-hole 180 is disposed about and spaced away from the axle 172 by the spherical surface 176 in at least one configuration or position.

The spherical surface 176 can be an outer surface of a sphere that has a channel extending therethrough. The channel is sized to permit the axle 172 to pass therethrough. The sphere is part of or is coupled or mounted to the axle 172 such that the spherical surface 176 is retained at a fixed elevation or position along the axle 172. The spherical surface 176 is preferably static or fixed relative to the axle 172.

In various embodiments, the through-hole 180 is formed in a cylindrical or hollow body 184 that extends along a longitudinal axis 188 that is disposed through the body 184. The hollow body 184 is disposed opposite the end 166, as shown in FIG. 7. The through hole 180 is larger than the spherical surface 176 in various embodiments such that the through-hole 180 can tilt relative to the longitudinal axis 174 of the axle 172 as discussed further below. The tilting motion is partly guided by interaction between an inner portion 192 of the hollow body 184 and the spherical surface 176.

In one embodiment, the inner portion 192 includes an interface surface 196 that matches the spherical surface 176 such that relative motion of the first and second members 160, 164 can be guided about the axle 172. The interface surface 196 can be configured as a groove extending radially outward from the inner portion 192 of the hollow body 184. The groove can be disposed about the surface of the sphere comprising the spherical surface 176. In certain embodiments, the groove has a height along the longitudinal axis 188 of the hollow body 184 that is less than about ½ of, e.g., less than about ¼ of, the diameter of the spherical surface 176. In this context the height of the groove can be compared to the diameter of the spherical surface 176 when the hollow body 184 is aligned with the axle 172 (e.g., as in FIG. 4A). The interface surface 196 can include a partial spherical surface that has a radius equal to or slightly larger than that of the spherical surface 176. In one embodiment, the interface surface 196 of the inner portion 192 is substantially spherical and extends by an angle of about five to about 15 degrees from the equator of the portion. The angle can be measured from a horizontal plane disposed midway between the top and bottom portions of the sphere defining the spherical surface 176. In one embodiment, the interface surface 196 of the inner portion 192 is substantially spherical and extends symmetrically above and below the equator of the inner surface.

The inner portion 192 preferably also has cylindrical portions that extend upward and downward from the interface surface 162. The cylindrical portions enable the axle 172 to be spaced from the top and the bottom of the hollow body 184 through a majority of the range of relative motion of the first and second members 160, 164 (e.g., a range including the positions shown in FIGS. 4A, 5A, and 6A, discussed further below). In certain embodiments, a first portion of the through hole 180 has a diameter that is less than the diameter of the spherical surface 172 and a second portion of the circular through hole 180 has a diameter equal to or greater than the diameter of the spherical surface 176. The first portion can overlap a top and bottom portion of the sphere defining the spherical surface 176 and can extend from that portion away from the sphere. The second portion can overlap an equatorial portion of the spherical surface 176 when the longitudinal axis 188 of the hollow body 184 and the longitudinal axis 174 of the axle 172 are aligned (e.g., as in FIG. 4A).

Figure 6A:
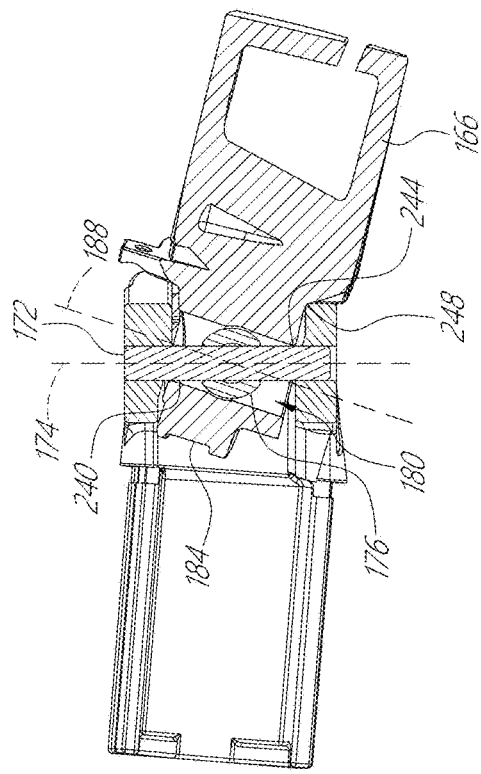
FIG. 6A is a cross-sectional view of the joint illustrated in FIG. 3 in the fully extended state of FIG. 6, the section plane taken through 6A-6A.
Figure 6:
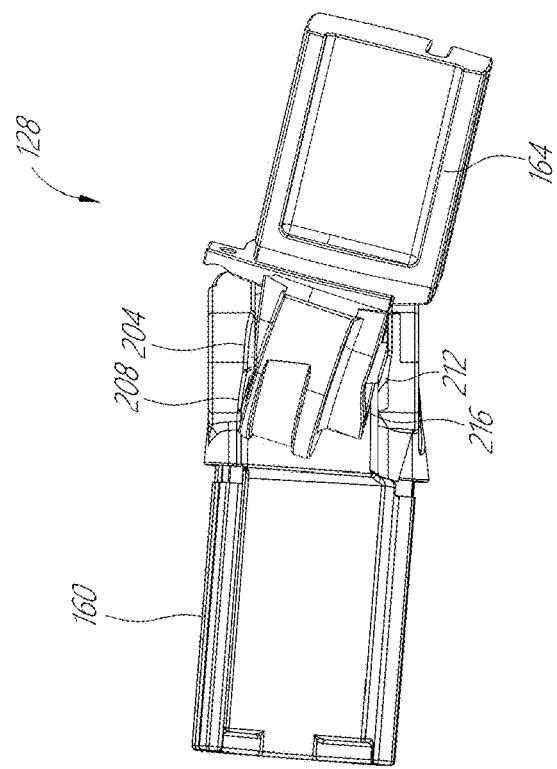
FIG. 6 is a perspective inside view of the joint illustrated in FIG. 3 in a fully extended state, showing features of the outside of the joint.

FIGS. 6 and 7 illustrate further features of the joint 128. In particular, the joint 128 can be configured to include at least one pair of mating surface to facilitate relative motion of the first member 160 relative to the second member 164. Because the arms 120, 124 are substantially rigid and are rigidly attached to the members 160, 164 such motion also controls the motion of the arms 120, 124. In one embodiment, the first member 160 includes an axle interface 200 opposite the end 162. The axle interface 200 includes the apertures 179 and a first contact surface 204. The hollow body 184 includes a second contact surface 208. The first and second contact surfaces 204, 208 are control surfaces in the sense that when the members 160, 164 are assembled about the axle 174 the interaction of these surfaces 204, 208 controls, at least in part, the relative motion of the members 160, 164 (and thereby the arms 120, 124).

The second contact surface 208 can be configured in any suitable manner. In one embodiment, the second contact surface 208 can be disposed on an eccentric protrusion of the hollow body 184. The eccentric protrusion can extend away from the axis 188 opposite the end 164. FIGS. 2 and 3 show that the eccentric protrusion upon which the contact surface 208 is formed in a retracted state. In the partially extended state of FIGS. 5 and 5A, the eccentric protrusion is disposed between the lobes 178A, 178B. When in the position illustrated in FIGS. 5 and 5A the first contact surface 204 allow the eccentric protrusion upon which the second contact surface 208 is disposed is accommodated in an elevated position compared to that of FIGS. 2-4A. In the fully extended state of FIGS. 6 and 6A, the eccentric protrusion is disposed between the axle 172 and the end 162 of the first member 160. FIGS. 6 and 6A show that the first contact surface 204 is shaped to permit the eccentric protrusion upon which the second contact surface 208 is disposed to be accommodated at a position that is further elevated in the extended position compared to that illustrated in FIGS. 5 and 5A. As the second portion 164 is rotated from the extended position (FIGS. 6 and 6A) toward the retracted position (FIGS. 4 and 4A) one or more of the lobes 178A, 178B acts upon the eccentric protrusion, e.g., the first contact surface 204 acts on the second contact surface 208 to raise the second member 164 to the aligned position of FIGS. 2-4A.

In one embodiment, the axle interface 200 includes a third contact surface 212. The hollow body 184 includes a fourth contact surface 216. The third and fourth contact surfaces 212, 216 can form additional control surfaces in the sense that when the members 160, 164 are assembled about the axle 174 the interaction of these surfaces controls, at least in part, the relative motion of the members 160, 164 (and thereby the arms 120, 124). The contact surfaces 208, 216 are formed on the hollow body 184 of the second member 164.

FIGS. 4-6A show the operation of certain embodiments, which is better understood by reviewing the structural relationship among the parts upon disposing the joint 128 in the illustrated positions.

Figure 4:
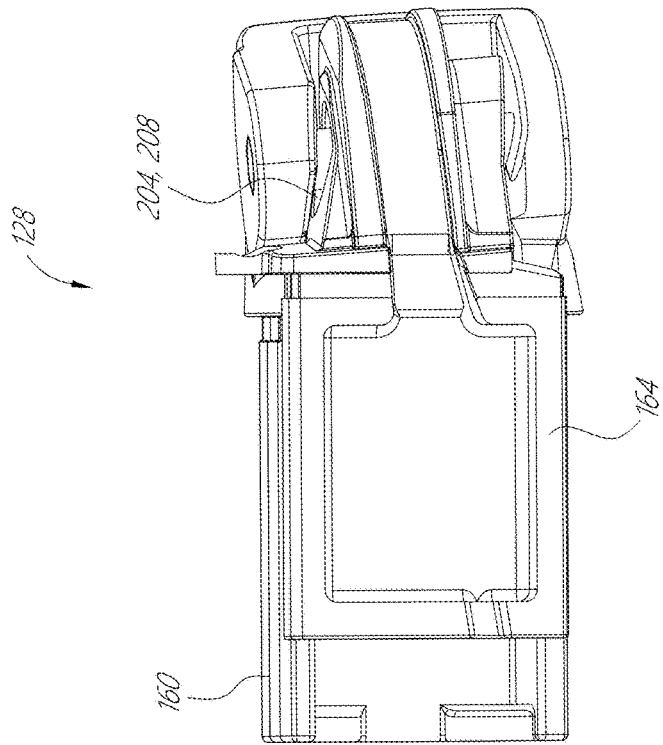
FIG. 4 is a side view of the joint of FIG. 2 in a retracted state.

FIGS. 4 and 4A show a state of the joint 128 in which the members 160, 164 (and the arms to which they are coupled) are folded or retracted. In this position a bight is formed between the outward facing surfaces of the first and second members 160, 164 as discussed above. Also, the contact surfaces 204, 208 are touching each other. The contact surface 204 is disposed at a selected orientation in space. The hollow body 184 is configured such that when the second member 164 is moved to the position illustrated in FIG. 4 relative tilting is provided between the first and second members 160, 164. If the first member 160 is constrained to move only in a horizontal plane, sliding movement of the contact surface 208 under the contact surface 204 upon folding or retracting causes or allows the second member 164 to move in a vertical plane as well as in a horizontal plane. This provides for tilting of the hollow body 184 relative to the axle 172. Such tilting has the effect of bringing the end 166 of the member 164 (and the arms 120, 124 coupled thereto) upward as well as inward toward the wall W when moving from a deployed position or configuration toward the stowed or retracted position of FIGS. 4 and 4A.

FIG. 4A is a cross-section taken through the axle 172 and extending through the bight formed between the first and second member 160, 164 when the arms 120, 124 are retracted. This view reveals further aspects of the joint 128 when the first and second arms 120, 124 are retracted and the first and second member 160, 164 are aligned. The hollow body 184 is disposed about the axle 172 such that these structures are aligned. That is, the longitudinal axes 174, 188 may be co-axial as shown. Also, the spherical surface 176 is disposed against the interface surface 196. In this position the equatorial region of the spherical surface 176 is disposed within between the upper and lower limits of the interface surface 196.

Figure 5A:
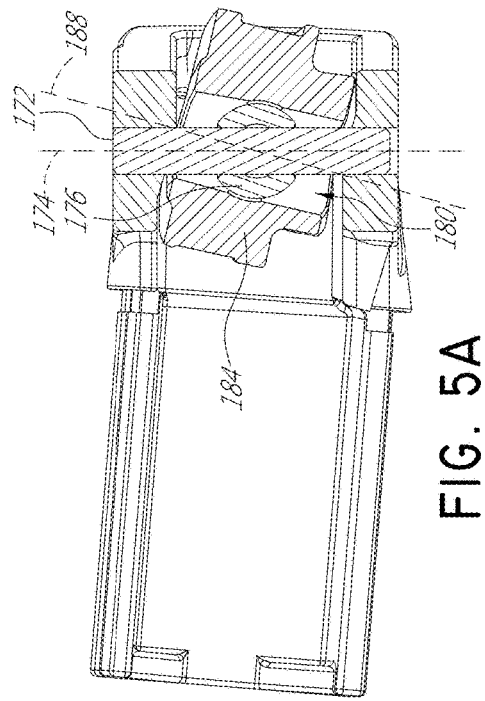
FIG. 5A is a cross-sectional view of the joint illustrated in FIG. 3 in the partially extended state of FIG. 5, the section plane taken through 5A-5A.
Figure 5B:
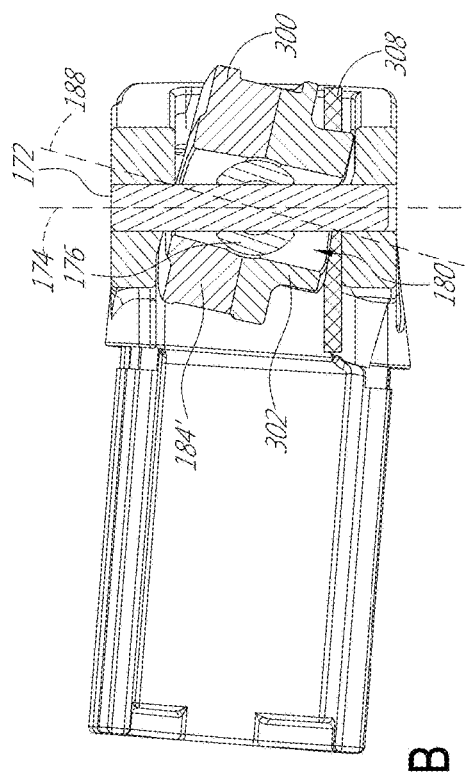
FIG. 5B is a cross sectional view of a joint similar to the one illustrated in FIG. 5B according to another embodiment.
Figure 5:
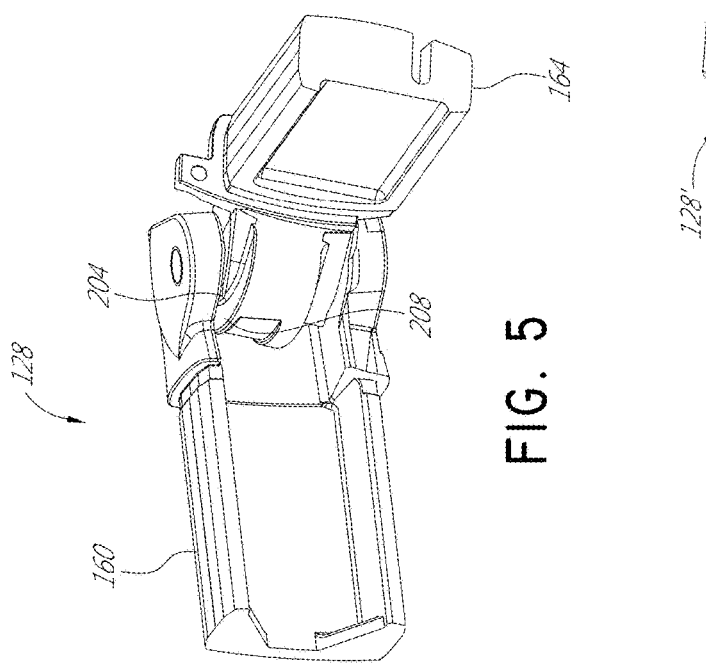
FIG. 5 is a perspective inside view of the joint illustrated in FIG. 2 in a partially extended state, showing features of the outside of the joint.

FIGS. 5 and 5A illustrate an extended position in which the second member 164 is rotated away from the first member 160. An awning incorporating the joint 128 would have a corresponding position where an arm coupled with the second member 164 and an arm coupled with the first member 160 would be rotated away from each outer as guided by the joint 128. FIG. 5 shows that the second contact surface 208 has emerged from beneath the first contact surface 204. This allows the end 166 of the second member 164 which is rigidly coupled with the hollow body 184 of the second member for no relative motion therebetween to move in a plane perpendicular to the longitudinal axis 174 of the axle 172 and also in a plane disposed at an angle to the plane perpendicular to the longitudinal axis 174. The angled plane may be a vertical plane. In the illustrated position a non-zero angle is provided between the longitudinal axis 174 of the axle 172 and the longitudinal axis 188 of the hollow body 184 as shown. The angle between the axes 174, 188 can correspond to, e.g., be equal to the angle between arms of an arm assembly including the joint 128, e.g., the angle a in certain embodiments. The angle provided in FIGS. 5 and 5A may be nearly the entire displacement in the vertical direction whereas the motion in the horizontal plane may cover only about one-half of the range of motion.

FIG. 5B illustrates a joint according to another embodiment. In FIG. 5B, the joint 128' is generally similar to, and may be implemented in a manner similar to, the joint 128 shown in FIGS. 5 and 5A. Some of the features of the joint 128' are depicted in FIG. 5B; however, it will be understood that other features described herein may be included in the embodiment shown in FIG. 5B. In some embodiments, features of the joint 128' are similar to features of the awning arm assembly shown in FIGS. 17A-17C and described below. As illustrated in FIG. 5B, joint 128' has a hollow body 184'. The hollow body 184' may have a composite structure. For example, the hollow body 184' may comprise an upper body portion 300 and a lower body portion 302. The upper body portion 300 and the lower body portion 302 may be configured and/or attached so as to prevent relative motion between them. The joint 128' may also include a contact insert 308. When present, the contact insert 308 may be disposed adjacent to an end of the hollow body 184', such as between the hollow body 184' and one of the upper and lower lobes 178A, 178B of the first member 160 (shown in FIG. 7). In FIG. 5B, the contact insert 308 is disposed between the hollow body 184' and the lower lobe 178B. As illustrated, the contact insert 308 may be shaped such that the axle 172 is disposed within the contact insert 308 (e.g., passing through a hole in the contact insert 308). In the embodiment shown in FIG. 5B, a bottom surface of the lower body portion 302 and a top surface of the contact insert 308 may be in contact with one another. When the members 160, 164 move relative to one another, the bottom surface of the lower body portion 302 may slide across or rotate over the top surface of the contact insert 308. Either or both of the lower body portion 302 and contact insert 308 may be configured to guide tilting of the second member 164 relative to the first member 160. Any or all of these components (the upper body portion 300, the lower body portion 302, and/or the contact insert 308) may be wear-resistant. For example, these components may be constructed in part or in whole using wear-resistant materials. Additionally, or alternatively, other portions or components may be constructed using wear-resistant materials.

FIGS. 6 and 6A show a fully deployed or extended state of the joint 128. In this state, the second member 164 is rotated fully away from the first member 160. This position may provide the greatest angle between the first member 160 (and awning arm coupled therewith) and the second member 164 (and awning arm coupled therewith). In this position the second contact surface 208 is even further removed from beneath the first contacts surface 204. This can allow some further tilting of the second member 164 relative to the first member 160 compared to the position of FIGS. 5 and 5A. FIG. 6 shows third and fourth contact surface 212, 216. The third contact surface 212 is disposed on the lower lobe 178B and provides a ramped support upon which the forth contact surface 216 can rest. The lobe 178B and the fourth contact surface 216 are shaped such that the fourth contact surface 216 is in contact with the third contact surface 212 only in the deployed state. As the second member 164 rotates relative to the first member 160 toward the retracted state and the contact surfaces 212, 216 move out of engagement and provide play permitting the hollow body 184 to tilt back from a non-zero angled position relative to the axle toward an aligned configuration as discussed above.

FIG. 6A shows that in the illustrated embodiment contact can be provided between relatively moveable portions of the joint 128 in the fully deployed state. Contact can be provided between inside surface or surface of the hollow body 184 and the axle 172. A first contact zone 240 can be provided at an end of the hollow body 184 disposed away from the end 166. A second contact zone 244 can be provided at an end of the hollow body 184 disposed toward the end 166. A third contact zone 248 can be provided between an outside surface of the second end 164 of the joint 126 and a portion of, e.g., the lower lobe 178B of, the first end 160 of the joint 128. By spreading the contact to location inside and outside the hollow body 184 the joint 128 can be made more robust and durable.

The foregoing structure provides a number of advantageous features as discussed above. Additionally, the joint 128 is able to provide complex motion of two or more arms of an arm assembly of an awning. Such complex motion is provided by a mechanism that has only a single axle. Further the joint 128 provides rotation about an axis of a rigid body that also tilts about or away from that axis. The tilt and rotation can be achieved by a single interface between an axle and the structure that tilts and rotates. Further the motion can aided or fully provided by interaction of one or more pairs of contact surfaces. The contact surfaces can be disposed on elegant integrated feature(s) such as one or more eccentric protrusions and corresponding cavities that house the protrusions in a manner that guides the tilting upon rotation of one or more components of the joint.

II. Awning Arm Assembly Joints having a Stationary End

Figure 9:
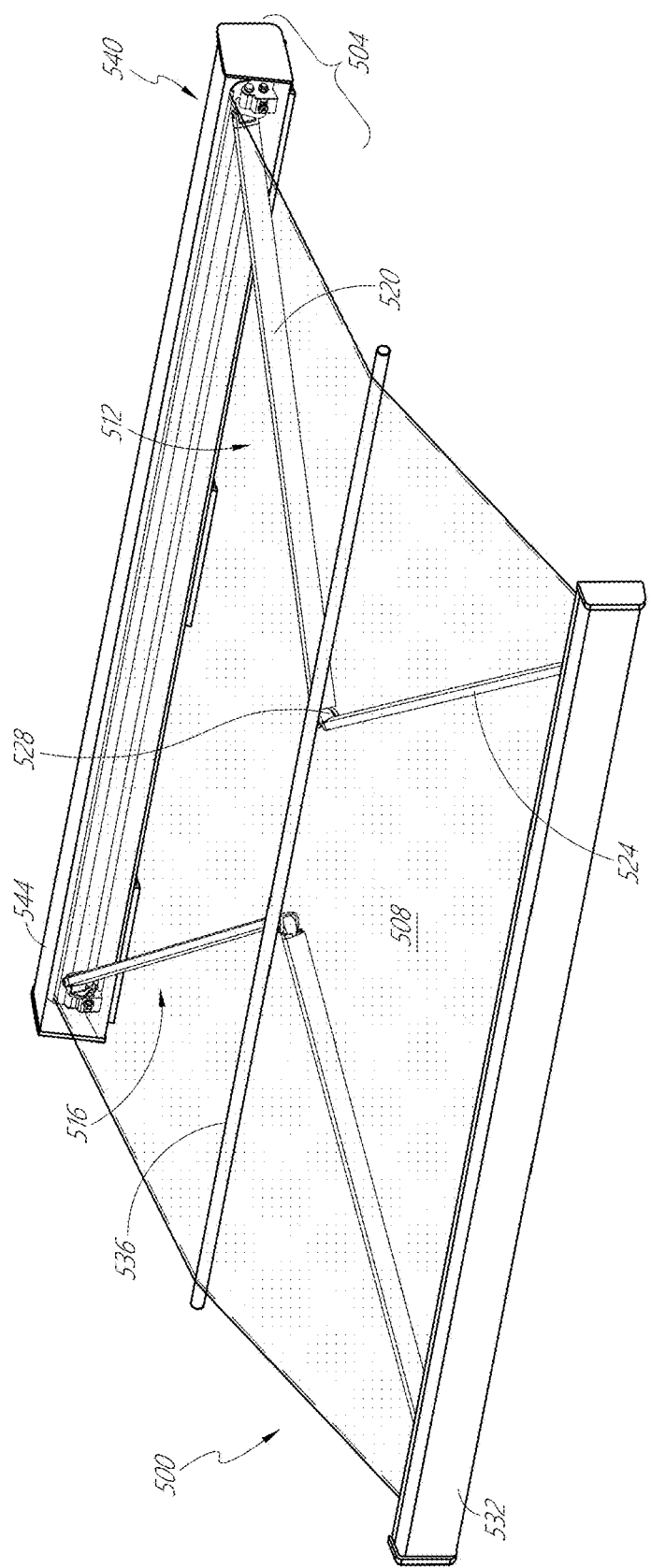
FIG. 9 is a perspective view of the awning of FIG. 1 in a partially deployed state.

FIG. 9 shows an embodiment of an awning 500 that may be mounted to the rooftop of a vehicle to provide shelter or to the wall or rooftop of a fixed structure in certain applications as discussed above. The awning 500 includes an awning arm assembly 504, a cover 508, cover support structures 512, 516, and a rooftop engagement portion 540. The cover 508 spans a gap between the cover support structures 512, 516. The awning arm assembly 504 may include a rooftop engagement portion 540. The rooftop engagement portion 540 may include a housing 544. As will be more fully described below, the awning arm assembly 504 includes an arm 520. FIG. 9 shows that in one embodiment the arm 520 is an inner arm.

The cover support structures 512, 516 are coupled to the awning arm assembly 504. The cover support structures 512, 516 are configured to be disposed in an extended position, e.g., as shown in FIG. 9. The cover support structures 512, 516 can be disposed in a retracted position (not shown). The cover support structure 512 includes the arm 520, an outer arm 524, a joint 528 disposed between the arm 520 and the outer arm 524, a front bar 532, and a support bar 536. The support bar 536 is disposed between the cover 508 and the cover support structure 512. In one embodiment, the arm 520 and the outer arm 524 are each hollow, elongate members that extend along generally straight longitudinal axes, though curved members are also possible. Solid members are also possible, as are members having solid portions and hollow portions.

The rooftop engagement portion 540 is configured to attach to a surface of a vehicle, such as a rooftop of the vehicle, at or above a mounting elevation. For example, the rooftop engagement portion 540 may be configured to attach to the rooftop portion 84 of the vehicle 80. The rooftop portion 84 may include a permanent structure, e.g., a rack, to which the rooftop engagement portion 540 may attach. The vehicle may be an RV or some other vehicle. The awning arm assembly 504 is coupled to the rooftop engagement portion 540. In some embodiments, the awning arm assembly 504 may be attached to the rooftop engagement portion 540 at an engagement region 604 (shown in FIGS. 11 and 12) of the awning arm assembly 504.

Figure 10:
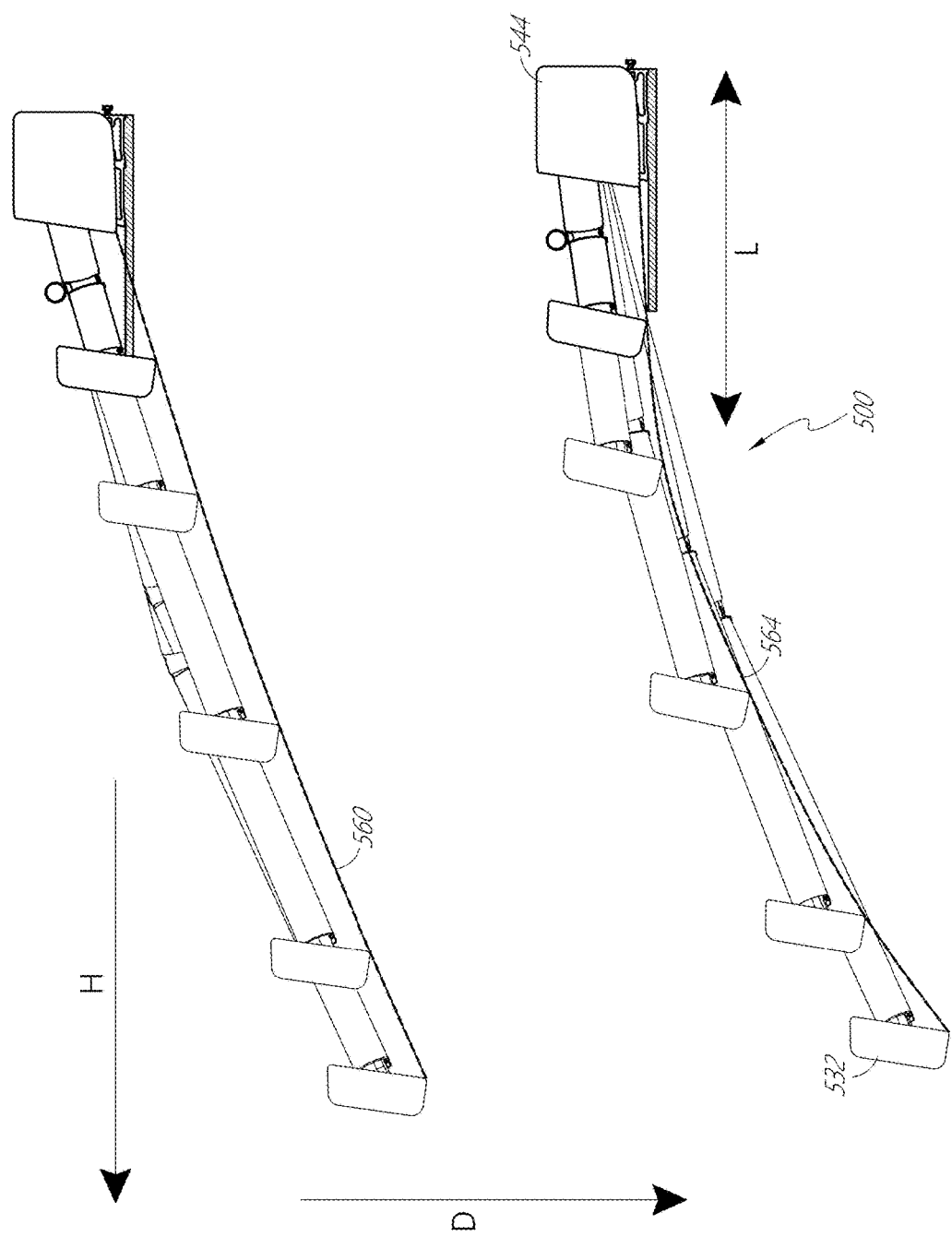
FIG. 10 is a side view of the deployment trajectory of a conventional awning arm assembly and of an embodiment of the awning of FIG. 1.

FIG. 10 shows the deployment trajectories of a conventional awning and of an embodiment of the awning 500. The deployment trajectory of the awning 500 may be traced by the path of motion of various components of the awning 500, such as the front bar 532 or an outer end of the arm 520 (not shown). The arrow D shows a direction of motion of an awning in a vertical plane during deployment. The arrow H shows a direction of motion of an awning in a horizontal plane during deployment. During deployment, the deployment trajectory 560 of a conventional awning traces a generally straight line, traveling in the directions H and D at an approximately constant rate. By comparison, the deployment trajectory 564 of the awning 500 traces a complex path that includes at least two segments with different slope, curvature and/or rate of change. At least one of the segments of the path may include a generally curved downward path. During an inner segment, the awning 500 remains at or around a constant elevation until after having traveled outward a clearance distance. After having traveled outward a clearance distance, the awning enters an outer segment of the path, in which the awning travels along a desirable trajectory. The desirable trajectory may include a constant rate of descent in the direction D or a generally increasing rate of descent in the direction D. Other trajectories are also possible. In one embodiment, in an inner segment of the path, the awning 500 experiences no or only a small amount of motion in the direction D until after having traveled a clearance distance L in the direction H. After traveling past the distance L, the awning 500 follows a second segment of the complex path. In the second segment, a significant change in the slope of the path occurs, with the front bar 532 (or other moving portion of the awning 500) progressing much more rapidly in the direction D for incremental movement in the direction H.

Figure 11:
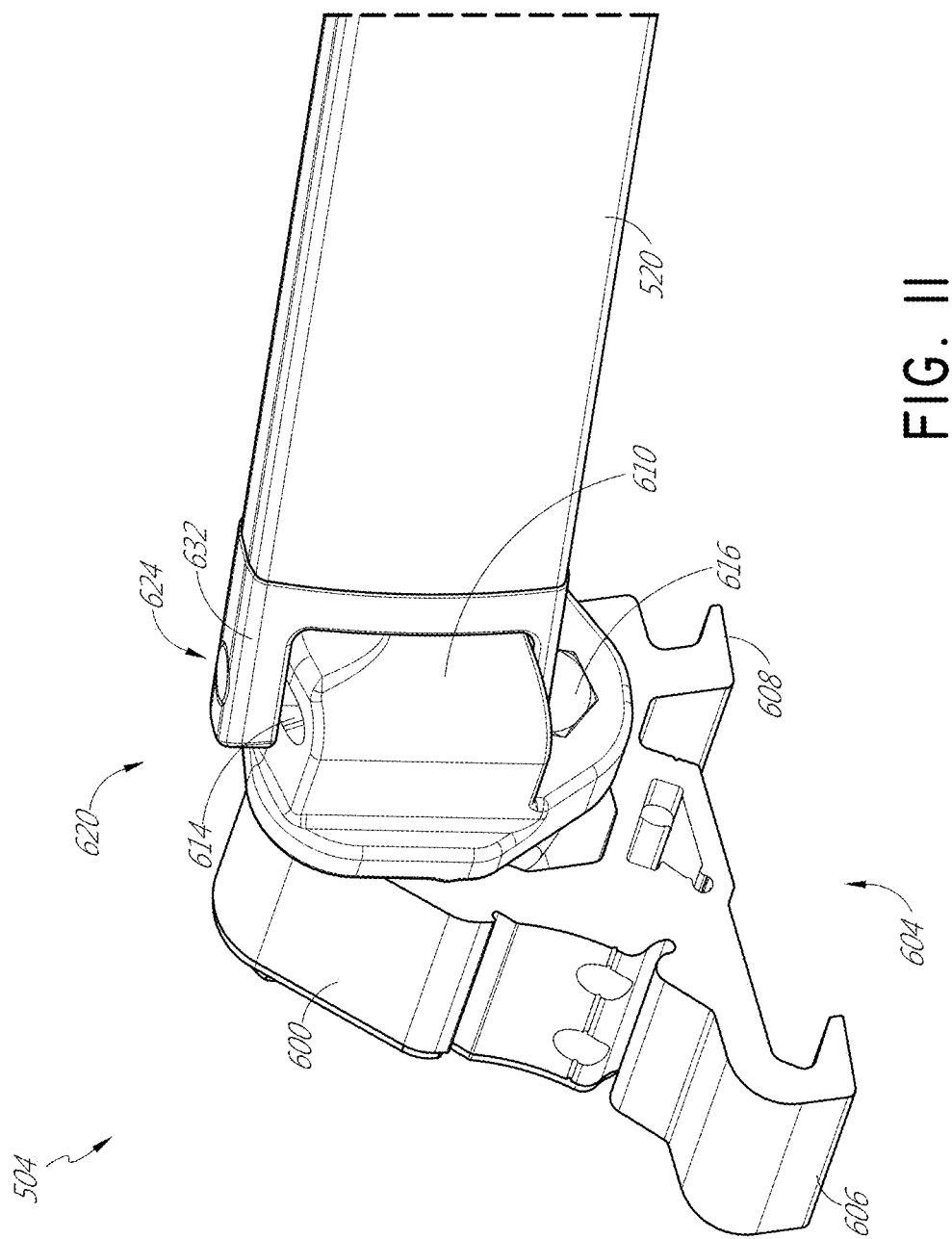
FIG. 11 is a perspective view of an awning arm assembly.
Figure 12:
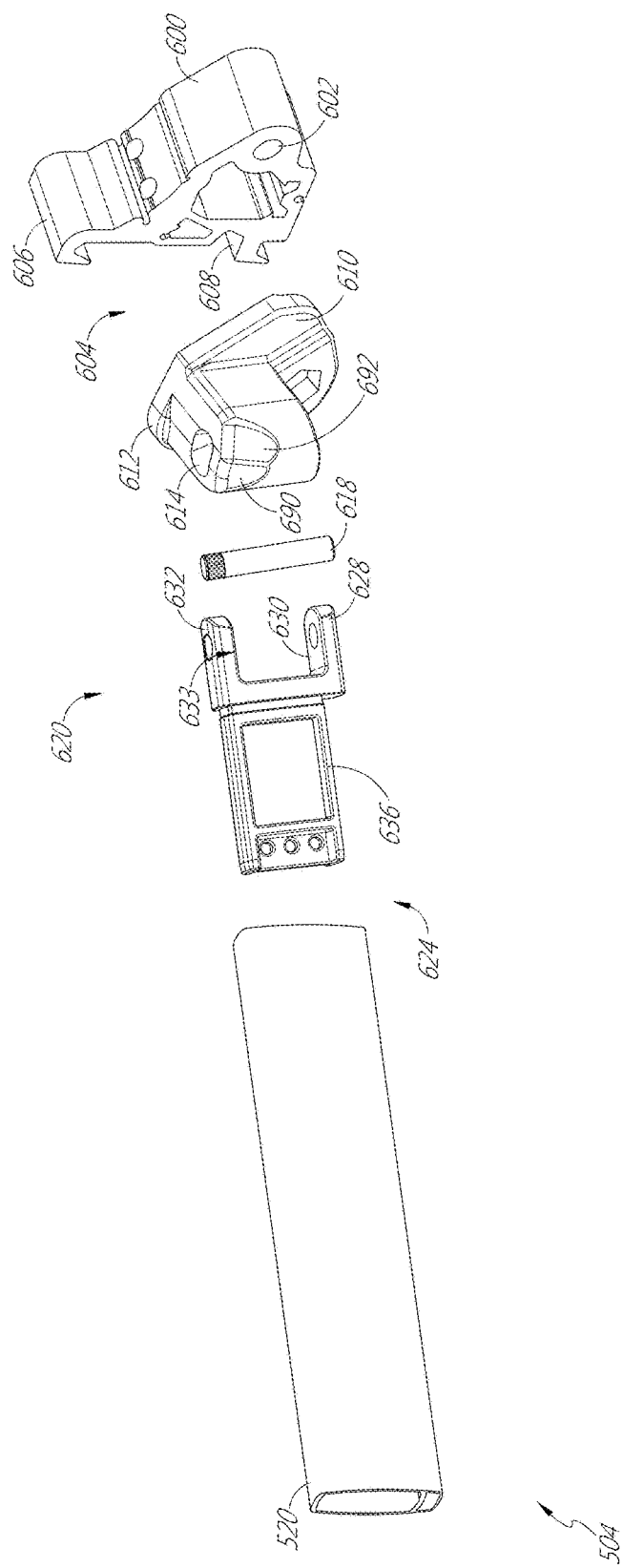
FIG. 12 is an exploded view of the awning arm assembly of FIG. 11.

FIGS. 11 and 12 show the awning arm assembly 504. The awning arm assembly 504 includes a rooftop mount structure 600, a joint 620, and the arm 520. The rooftop mount structure 600 has a rooftop engagement region 604. The rooftop mount structure 600 may have one or more connectivity features. The engagement region 604 includes engagement features 606, 608. The joint 620 includes a hollow body 610 and an axle 618. The hollow body 610 includes a bottom surface 611 (shown in FIG. 13), a contact surface 612, and a channel 614. The contact surface 612 of the hollow body 610 may include a plurality of distinct facets or portions 690, 692. The hollow body 610 may have one or more connectivity features. The connectivity features provide for securing the hollow body 610 to the rooftop mount structure 600 as discussed further below. The arm 520 includes an inner end 624 and an outer end (not shown, but which may be disposed adjacent to the joint 528). The inner end 624 has a first fork portion 628 and a second fork portion 632. The first fork portion 628 includes a first surface 630. The second fork portion 632 includes a second surface 633.

In some embodiments, the inner end 624 of the arm 520 further comprises an interior portion 636. The interior portion 636 is adjacent to the first fork portion 628 and second fork portion 632. The interior portion 636 may be coupled to the arm 520. As one example, the interior portion 636 may slide into a hollow portion or recess of the arm 520. The hollow portion or recess of the arm 520 may be configured to receive the interior portion 636.

The hollow body 610 may be coupled with the rooftop mount structure 600 such that there is no relative movement between the hollow body 610 and the rooftop mount structure 600. In some embodiments, the hollow body 610 and the rooftop mount structure 600 are coupled to allow the position of the hollow body 610 to be adjusted with respect to the rooftop mount structure 600. In these embodiments, relative movement of the hollow body 610 is prevented when the hollow body 610 is attached to the rooftop mount structure 600 and after adjustment. In embodiments where the rooftop mount structure 600 and the hollow body 610 have one or more connectivity features, their respective connectivity features allow for the rooftop mount structure 600 and the hollow body 610 to be attached. Using the connectivity features, the rooftop mount structure 600 and the hollow body 610 may be attached such that there is no relative movement between the rooftop mount structure 600 and the hollow body 610. For example, the connectivity features may include channels configured to receive fasteners such as a bolt for screws that are configured such that the respective connectivity features of the rooftop mount structure 600 and the hollow body 610 align. In this example, the hollow body 610 is securely attached to the rooftop mount structure 600 by use of a bolt 616, as illustrated in FIG. 11. Other means of attaching the rooftop mount structure 600 and the hollow body 610 may also be used. In other embodiments, the rooftop mount structure 600 and the hollow body 610 comprise a single component.

The engagement features 606, 608 may be configured to allow the awning arm assembly 504 to be attached to the rooftop of a vehicle at or above a mounting elevation. The engagement features 606, 608 may allow the awning arm assembly 504 to be securely attached to the rooftop engagement portion 540. In some embodiments, the engagement features 606, 608 are configured to attach to a rack structure that is securely attached to the roof of a vehicle.

The channel 614 is disposed within the hollow body 610. The hollow body 610 is coupled with the axle 618 such that the axle 618 is disposed in the channel 614. The axle 618 is coupled with the inner end 624 of the arm 520. The axle 618 is disposed between the first fork portion 628 and the second fork portion 632 of the inner end 624. The contact surface 612 is disposed at one end of the channel 614. The contact surface 612 is adjacent to a first end 672 of the channel 614. The bottom surface 611 is disposed at an end of the channel 614 opposite the contact surface 612. The bottom surface 611 is adjacent to the second end 680 of the channel 614.

As will be more fully described below, the coupling of the arm 520 and the axle 618 allows the arm 520 to move relative to the rooftop mount structure 600 and the hollow body 610 in a first plane of motion. The first plane of motion can be generally horizontal, e.g., generally parallel to a surface on which the rooftop mount structure 600 is mounted. The arm 520 is permitted to rotate about a longitudinal axis 619 of the axle 618 (shown in FIG. 13). Movement of the arm 520 about the axis 619 of the axle 618 causes an angle between the arm 520 and a surface of the rooftop mount structure 600 to which the hollow body 610 is attached to be adjusted. Movement of the arm 520 about the axis 619 of the axle 618 causes an outer end of the arm 520 to trace a generally radial path in the first plane of motion. Movement of the arm 520 about the axle 618 thus causes an outer end of the arm 520 to move a distance from the rooftop mount structure 600 in the first plane of motion. The plane can correspond to the arrow H in FIG. 10.

Movement of the arm 520 about the axis 619 of the axle 618 defines a maximum range of motion of the arm 520. The awning arm assembly 504 has a retracted or low profile configuration when the joint 620 is folded and a deployed configuration when the joint 620 is fully extended. A full range of motion of the arm 520 can be defined between the retracted and the deployed configurations. When the joint 620 is fully extended, the awning 500 has completed its deployment trajectory as described above. When the joint 620 is fully extended, the arm 520 is disposed at a maximum angle with respect to a face of the hollow body 610 that is coupled with the mount structure 600 and the rooftop mount structure 600.

Additionally, because the channel 614 is wider at the first and second ends 672, 680 than it is at the point 676 (shown in FIGS. 14A, 14B, 15A, and 15B), the axle 618 is permitted to rotate, or tilt, within the channel 614. The arm 520 is thus permitted to rotate about an axis A (shown in FIG. 14A) that is disposed at a non-zero angle to the longitudinal axis 619 of the axle 618. Movement in this manner is restricted by the shape of the channel 614. Tilting of the axis 618 in the channel 614, such as rotation about the axis A in FIG. 14A, permits an outer end of the arm 520 to descend in a second plane of motion. The second plane of motion is disposed at a non-zero angle to the first plane of motion. The second plane may correspond to the arrow D in FIG. 10. As explained above with respect to FIG. 10, the awning arm assembly 504 may be configured such that the outer end of the arm 520 remains at or above a clearance elevation in the second plane of motion until after having traveled a clearance distance in the first plane of motion.

Figure 13:
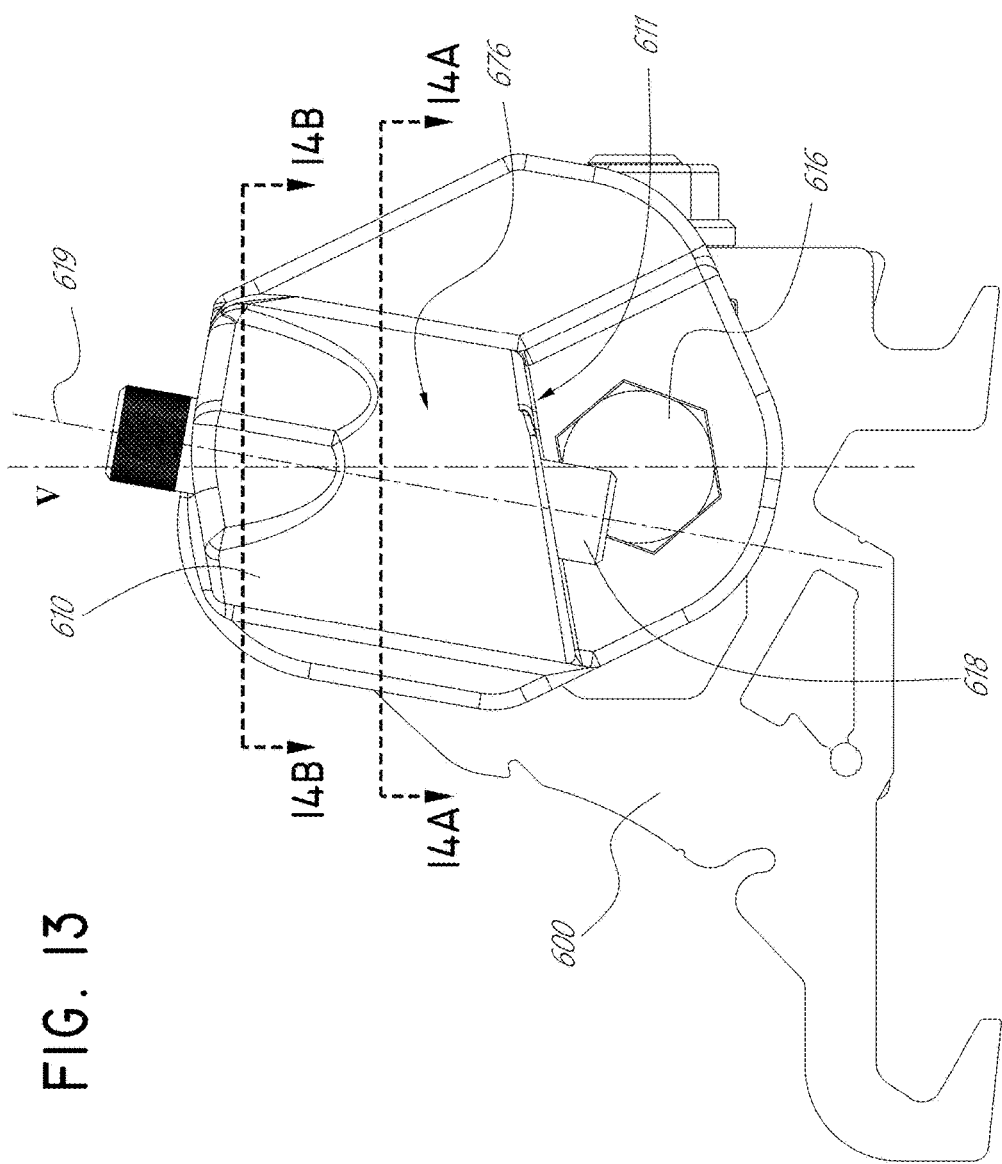
FIG. 13 is a side view of a hollow body of the awning arm assembly of FIG. 11.

FIG. 13 illustrates how the arm 520 is permitted to tilt with respect to the hollow body due to tilting of the axle 618 in the channel 614. FIG. 13 shows the hollow body 610 of the awning arm assembly 504. As discussed above, the axle 618 has a longitudinal axis 619. The shape of the channel 614 permits movement of the axle 618 within the channel 614. The axle 618 is thus permitted to both rotate within the channel 614 and tilt with respect to the channel 614. Both the tilting and the rotation of the axle 618 within the channel 614 may be controlled by the interacting facets or control surfaces of the inner end 624 of the arm 520 (e.g., the first surface 630 and/or the second surface 633) and the hollow body 610 (e.g., the bottom surface 611 and/or contact surface 612). Tilting of the axle 618 within the channel 614 may take place generally about the axis A (shown in FIG. 14A). The axis A is disposed at a non-zero angle to the longitudinal axis 619 of the axle 618. The axle 618 may also be permitted to tilt about an axis perpendicular to A, such that opposite ends of the axle 618 move closer to and away from the hollow body 610 and the structure that is coupled with the rooftop mount structure 600, respectively. These two directions of tilting within the channel 614 are illustrated below in FIGS. 15A and 15B. Tilting of the axle 618 within the channel 614 in these directions may occur simultaneously. The movement of the axle 618 within the channel 614 in this way allows the axle 618 to move relative to the hollow body 610. Movement of the axle 618 relative to the hollow body 610 in this way allows the longitudinal axis 619 of the axle 618 to be disposed at an angle with respect to a vertical plane V. A longitudinal axis of the channel 614 may lie within the plane V, although the axis of the channel 614 may also be disposed at a non-zero angle to the plane V. This tilting movement permits the downward awning deployment trajectory described above.

Tilting of the axle 618 in the channel 614 may be controlled by the interaction between the bottom surface 611 of the hollow body 610 and the first surface 630 of the first fork portion 628. In addition or alternatively, this tilting may be controlled by the interaction between the contact surface 612 of the hollow body 610 and the second surface 633 of the second fork portion 632. The interactions of these surfaces and the manner in which they may control tilting of the axle 618 in the channel 614 is explained below with reference to FIGS. 16A and 16B.

Figure 14B:
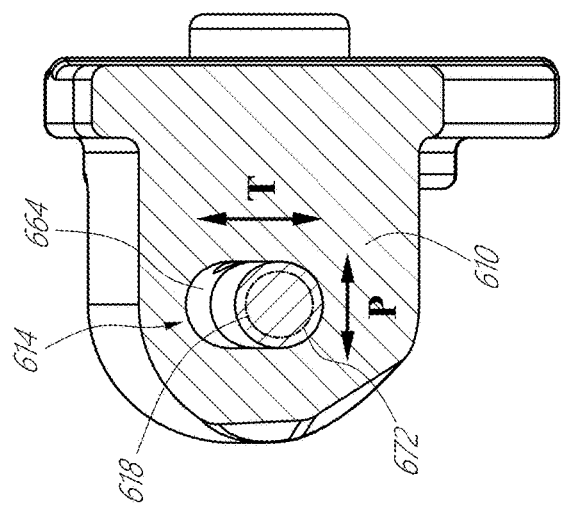
FIG. 14B is a partial cross-sectional view of the hollow body in FIG. 13, the sectional plane taken through 14B-14B.
Figure 14A:
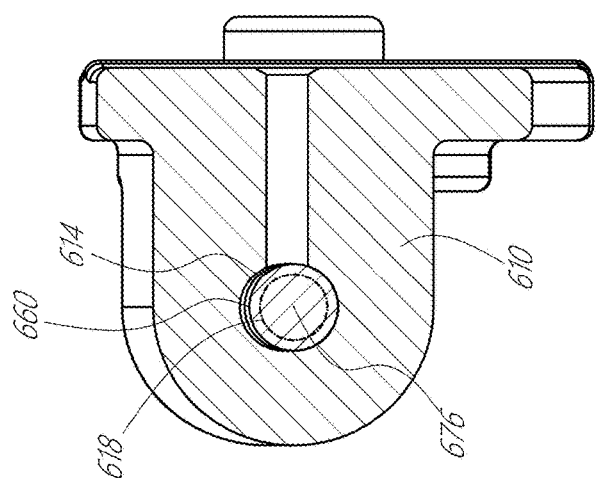
FIG. 14A is a partial cross-sectional view of the hollow body in FIG. 13, the sectional plane taken through 14A-14A.

FIGS. 14A and 14B show the interior of the hollow body 610. FIG. 14A shows a cross-section of the hollow body 610 at a point 676 along a longitudinal axis of the channel 614 between a first end 672 (not shown) and a second end 680 (not shown) of the channel 614. The longitudinal axis of the channel 614 may generally align with the vertical plane V shown in FIG. 13. The channel 614 is narrower at the point 676 than it is at the first and second ends 672, 680. The channel provides a smaller space 660 about the axle 618 at the point 676. The narrower perimeter of the channel 614 at the point 676 constrains lateral movement at the point 676 transverse to the axis A. The wider perimeter at or adjacent to the ends 672, 680 permits the axle to tilt about the axis A at the point 676 and about an axis transverse to the axis A.

FIG. 14B shows a cross-section of the hollow body 610 at the first end 672 of the channel 614. The channel 614 is larger in a direction transverse to the axis A, illustrated by the line T, than it is in a direction generally parallel to the axis A, illustrated by the line P. The channel 614 also has a wider perimeter at the first end 672 than at the point 676. The channel 614 can be larger in a direction transverse to the axis A and also have a wider perimeter at the second end 680 than at the point 676. The channel 614 is wider at all points than an outer perimeter of the axle 618. The channel 614 provides a greater space around the axle 618 at the first and second ends 672, 680 than at the point 676.

Because the channel 614 is wider in the direction transverse to the axis A than it is in the direction parallel to the axis A, a greater degree of tilting is permitted about the axis A. That is, the axle 618 may experience a greater range of motion when rotating about the axis A than in the parallel direction. This greater range of motion of the axle 618 about the axis A enables the downward trajectory of the awning described above while preventing the arm 520 from coming into contact with the mounting surface (e.g., the roof of a vehicle) when the awning is in a folded state. Specifically, this greater range of motion may allow for the downward trajectory of the awning to accelerate after the arm 520 has traveled a clearance distance, as described above with respect to FIG. 10.

Movement of the axle 618 relative to the channel 614 about the axis A is restricted by the first and second ends 672, 680 of the channel 614. Further tilting of the axle 618 is prevented when the axle 618 comes into contact with an interior surface of the channel 614 at the first and second ends 672, 680. Tilting of the axle 618 may also or alternatively be prevented due to the interaction of the control facets on one or both of the inner end 624 of the arm 520 and the hollow body 610.

Figure 15:
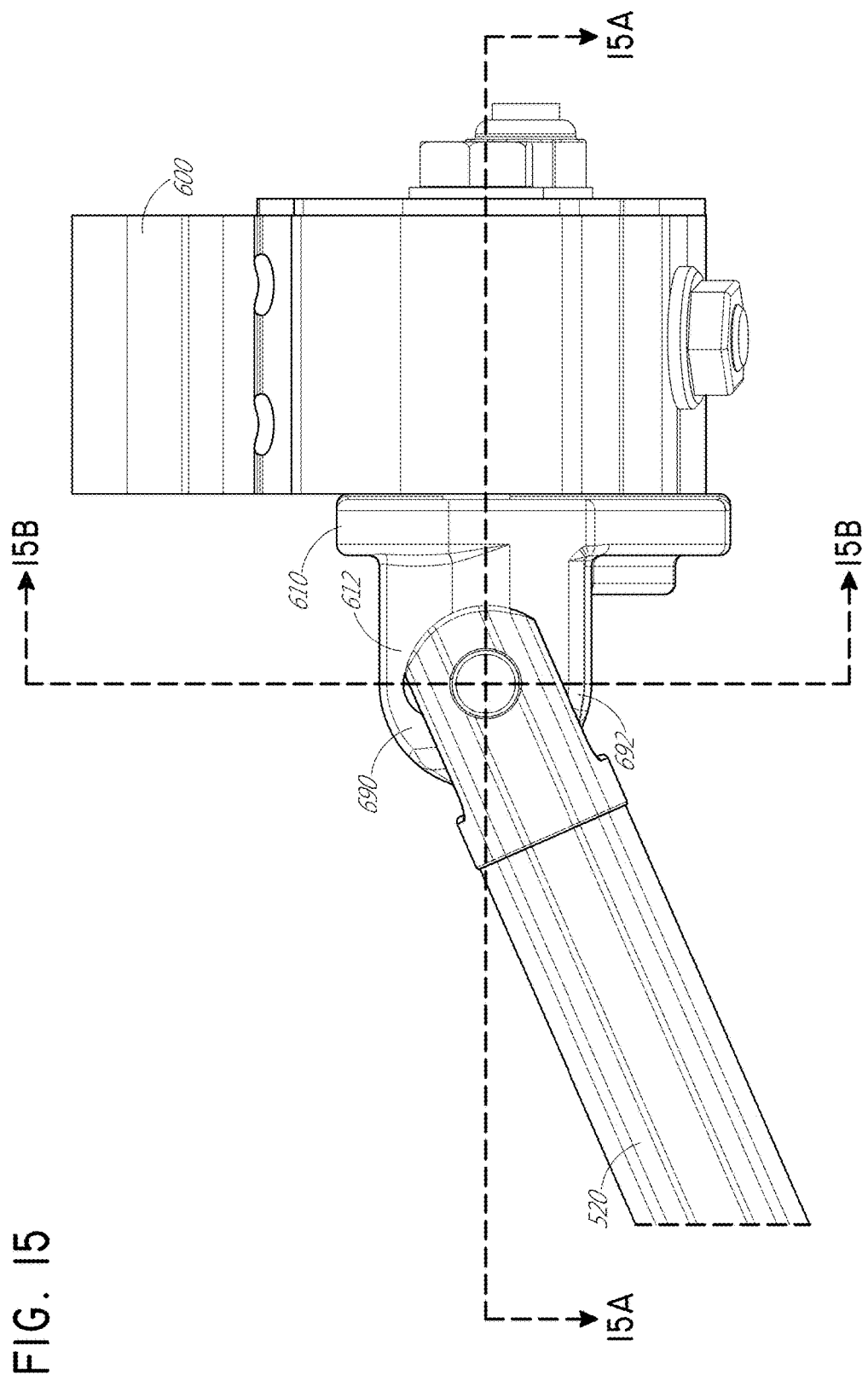
FIG. 15 is a top view of the awning arm assembly.

FIG. 15 shows a top view of the awning arm assembly. As illustrated in FIG. 15, the contact surface 612 of the hollow body 610 may be shaped to provide a plurality of distinct facets or portions 690, 692.

Figure 15B:
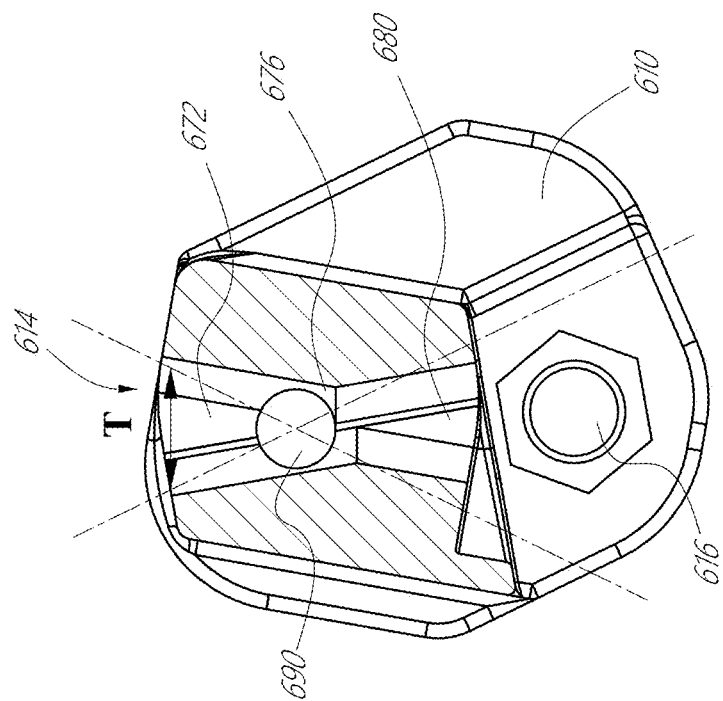
FIG. 15B is another partial cross-sectional view of the hollow body focusing on the channel of the hollow body the section plane through 15B-15B in FIG. 15.
Figure 15A:
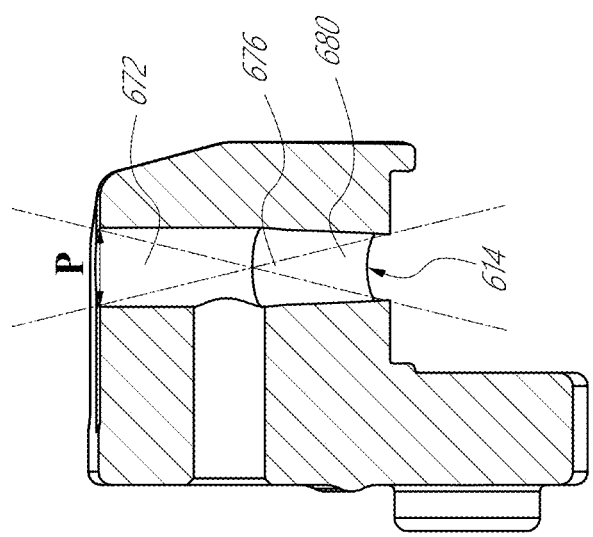
FIG. 15A is a partial cross-sectional view of the hollow body focusing on the channel of the hollow body the section plane through 15A-15A in FIG. 15.

FIGS. 15A and 15B illustrate the range of motion permitted for the axle 618 in the channel 614. FIG. 15A shows the interior of the hollow body 610. FIG. 15B shows the interior of the hollow body 610 rotated 90 degrees from the viewpoint of FIG. 15A. FIGS. 15A and 15B again illustrate that the channel 614 is wider in a direction T that is transverse to the axis A than it is in a direction P that is generally parallel to the axis A. FIG. 15A shows that a transverse dimension of the channel 614 at the point 676 is smaller than the transverse dimension at the first and second ends 672, 680. FIG. 15B shows that another transverse dimension of the channel 614 at the point 676 is smaller than the transverse dimension at the first and second ends 672, 680. Additionally, a perimeter of the channel 614 is greater at the first and second ends 672, 680 than it is at the point 676. The channel 614 provides a greater amount of space in which the axle 618 can move at the first and second ends 672, 680 than at the point 676. The axle 618 may move about the axis A (shown in FIG. 14A) located at the point 676. Movement of the axle 618 about the axis A permits tilting of the arm 520 relative to the rooftop mount structure 600. As the arm 520 rotates about the axis 619, the axle 618 may contact different portions of an interior surface of the channel 614 along the perimeter of the channel 614.

As discussed above, in some embodiments, the hollow body 610 includes connectivity features for attachment to the rooftop mount structure 600. For example, the connectivity features may include one or more channels configured to receive a fastener such as a bolt or screw. The channels may be configured such that they align with corresponding channels in the rooftop mount structure 600. In addition to the bolt 616, the hollow body 610 may comprise other connectivity features, such as a threaded hole 690. When the hollow body 610 and the rooftop mount structure 600 are securely attached, relative movement between them is prevented. In some embodiments one or both of the rooftop mount structure 600 and the hollow body 610 are configured to permit relative movement for adjustment prior to being securely attached.

Figure 16A:
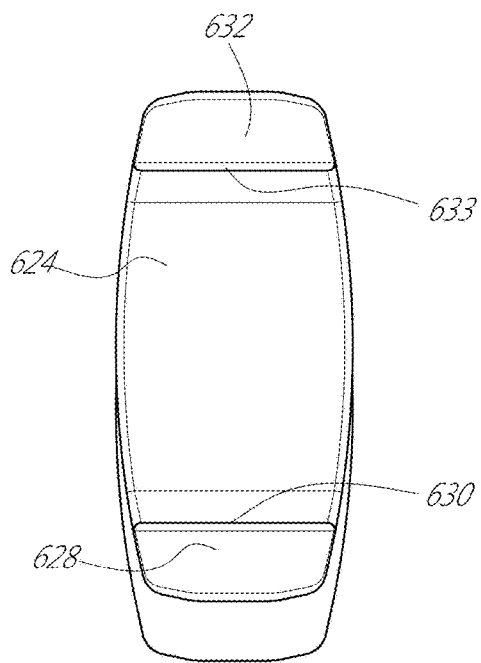
FIG. 16A is a side view of an arm of the awning arm assembly of FIG. 11 according to one embodiment.

FIG. 16A shows the inner end 624 of the arm 520 according to one embodiment. The inner end 624 includes the first and second fork portions 628, 632. The first fork portion 628 includes the first surface 630. The second fork portion 632 includes the second surface 633. The first and second fork portions 628, 632 are disposed such that they extend from the inner end 624 in planes that are approximately parallel to each other. The first surface 630 is in contact with the bottom surface 611 of the hollow body 610 (shown in FIG. 13). This contact may be continuous throughout rotation of the arm 520 about the axis 619 of the axle 618 or it may occur for only a portion of the complete range of motion of the arm 520 about the axis 619. Only a portion of each of the first surface 630 and the bottom surface 611 may be in contact at any given time. For example, the bottom surface 611 may be disposed at an angle such that the first surface 630 contacts only a portion of the bottom surface 611 when the joint 620 is in a folded state. The first surface 630 and the bottom surface 611 are configured to slide past each other as the arm 520 rotates about the longitudinal axis of the axle 618. The first surface 630 and the bottom surface 611 may be shaped so as to permit tilting of the arm 520 relative to the hollow body 610 by movement about the axis A and/or transverse to the axis A as the arm 520 rotates relative to the hollow body 610.

The contact surface 612 of the hollow body 610 is configured to contact the second surface 633 of the inner end 624 of the arm 520. The contact surface 612 may be configured to slide past the second surface 633. Contact between the contact surface 612 and the second surface 633 may be continuous throughout rotation of the arm 520 about the axis 619 or it may occur only for a portion of the complete range of motion of the arm 520 about the axis 619. Only a portion of each of the contact surface 612 and the second surface 633 may be in contact at any given time. The contact surface 612 and the surface 633 of the inner end 624 of the arm 520 may be shaped to permit tilting of the arm 520 relative to the hollow body 610 by movement about the axis A as the arm 520 rotates relative to the hollow body 610. Rotation of the arm 520 relative to the hollow body 610 may thus be controlled either by the first surface 630, by the contact surface 612, or by both.

As explained above, the contact surface 612 of the hollow body 610 may be shaped to provide a plurality of distinct facets or portions 690, 692 (shown in FIGS. 12 and 15). These distinct portions 690, 692 may be configured so as to control the motion of the axle 618 about the axis A within the channel 614. The second surface 633 may be in contact with a first facet or portion 690 of the contact surface 612 when the joint 620 is folded. The second surface 633 may be in contact with a second facet or portion 692 when the joint 620 is extended. The outer end of the arm 520 may remain above a clearance elevation while the second surface 633 is in contact with a first facet or portion 690 of the contact surface 612. The outer end of the arm 520 may be in contact with a second facet or portion 692 during extension of the joint 620 when the outer end of the arm 520 has traveled a clearance distance from the rooftop mount structure 600. The facets or portions 690, 692 of the contact surface 612 may be disposed at an angle with respect to one another such that the transition from one to the other while the surface 633 is sliding across the contact surface 612 causes the change in trajectory described above with respect to FIG. 10.

Figure 16B:
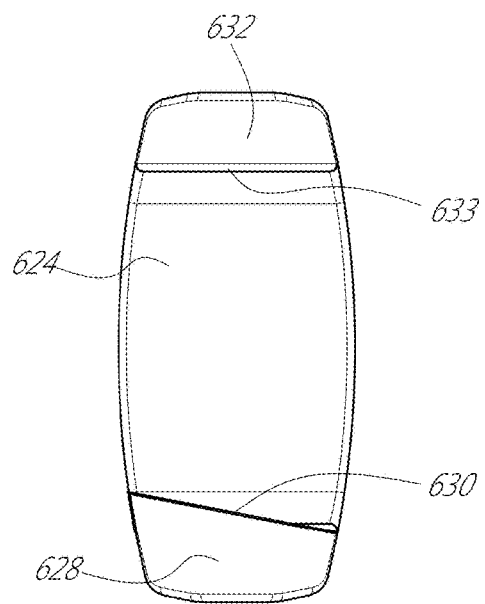
FIG. 16B is a side view of another arm of the awning arm assembly of FIG. 11 according to another embodiment.

Additionally or alternatively, the first surface 630 of the inner end 624 may be configured to control the movement of the axle 618 about the axis A. FIG. 16B illustrates one way that the first surface 630 may be shaped according to another embodiment. In this embodiment, the first surface 630 is shaped such that the first and second fork portions 628, 632 are disposed at an angle to one another. This shaping of the first surface 630 controls movement of the axle 618 within the channel 614. As the first surface 630 and the bottom surface 611 slide past each other, the axle 618 tilts to a greater or lesser degree. This sliding creates a greater or lesser angle between the longitudinal axis 619 or the axle 618 and the longitudinal axis of the channel 614. The first surface 630 may thus be shaped so as to restrict motion of an outer end of the arm 520 in a vertical direction until after the outer end of the arm 520 has traveled a clearance distance in a horizontal direction during the transition of the awning arm assembly from a folded configuration to an extended configuration.

Figure 17B:
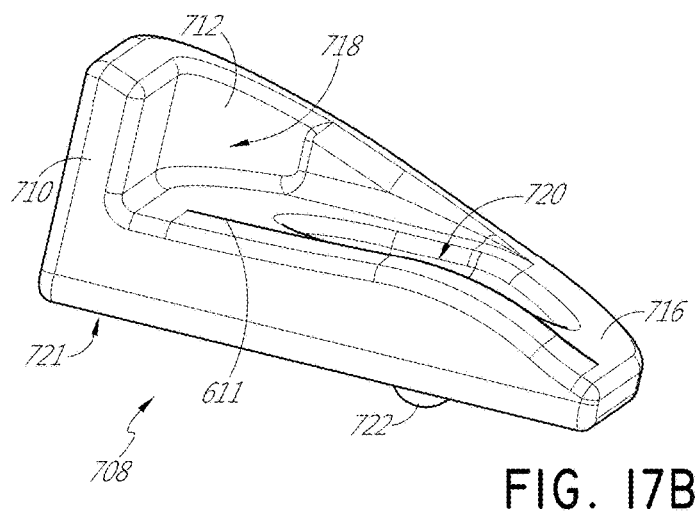
FIG. 17B is a perspective view of an engagement cap of the hollow body assembly shown in FIG. 17A.
Figures 1, 17B:
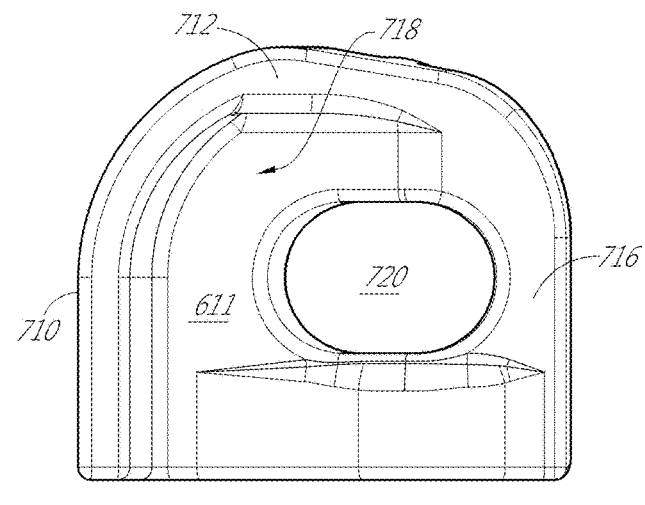
Figures 2, 17B:
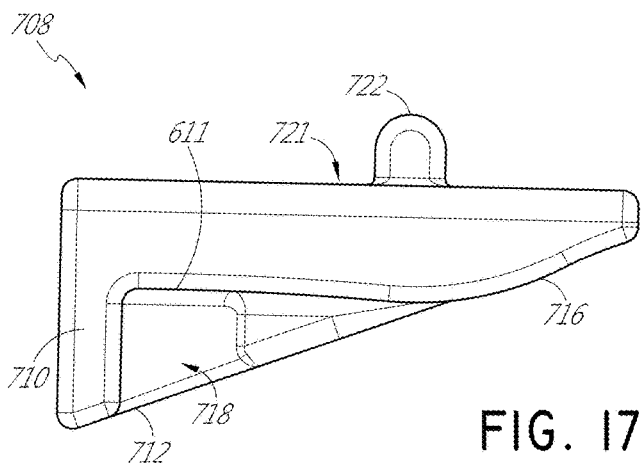

FIG. 17A illustrates an awning arm assembly 504A according to another embodiment. The embodiment of FIG. 17A is generally similar to the embodiments described above with reference to FIGS. 9-16B. The embodiment of FIGS. 17A-17C can also be implemented as a modification of the embodiments of FIGS. 1A-8 (e.g., as shown in FIG. 5B). Some of the features of the awning arm assembly 504A will be discussed again here; however, it will be understood that other features previously described may be included in the embodiment shown in FIG. 17A.

As before, the awning arm assembly 504A includes a rooftop mount structure 600, a joint 620, and an arm 520. The joint 620 includes a hollow body assembly 706 comprising a hollow body 700 and an axle (not shown but similar to the axle 618). As described above, the hollow body assembly 706 includes a bottom surface 611, a contact surface 612, and a channel 614. The bottom surface 611 may comprise a ramped portion 716 (shown in FIG. 17B). The contact surface 612 of the hollow body 700 may include a plurality of distinct facets or portions 690, 692 (as shown in FIGS. 12 and 15). The arm 520 includes an inner end 624. The inner end 624 has a first fork portion 628 and a second fork portion 632. The first fork portion 628 includes or is disposed adjacent to the first surface 630. In the embodiment shown in FIG. 17A, the first fork portion 628 further comprises a main body 728. A contact insert 730 is disposed adjacent to the main body portion 728 and adjacent to the bottom surface 611. When included, the contact insert 730 can comprise the first surface 630. If not included, the first surface can comprise a surface of the first fork portion 628. As will be described in greater detail with reference to FIG. 17C, the contact insert 730 further comprises a through hole 738, a first leg 732 and a second leg 734.

As illustrated in FIG. 17A, the hollow body assembly 706 may have a composite structure. For example, the hollow body assembly 706 may comprise a plurality of components. In the embodiment shown in FIG. 17A, the hollow body assembly 706 comprises a hollow body 700 and a wear-resistant component. In FIG. 17A, the wear-resistant component is an engagement cap 708. The hollow body 700 comprises or encloses a portion of the channel 614 and comprises the contact surface 612. The hollow body 700 further includes a notch 704 along its edge nearest to the engagement cap 708. The engagement cap 708 comprises the bottom surface 611, an elongated opening 720 (shown in FIG. 17B), an interface 721 (shown in FIGS. 17B and 17B-2), and a stud 722. The interface 721 is disposed on a side of the engagement cap 708 nearest to the hollow body 700. The stud 722 is disposed on, and generally extends away from, the interface 721. Further features of the engagement cap 708 will be described below with reference to FIGS. 17B, 17B-1, and 17B-2.

The hollow body 700 is disposed adjacent to the engagement cap 708, contacting the engagement cap 708 on a side of the engagement cap 708 opposite the bottom surface 611. The main housing 700 and the engagement cap 708 are configured such that the channel 614 aligns with the opening 720 to define a continuous space in which an axle, similar to the axle 618, is disposed. In this sense, the engagement cap 708 includes a portion of the channel 614. The elongated opening 720 can be configured to generally match the greater width of the channel 614 at the second end 680 (shown in FIGS. 15A-15B). The hollow body 700 and engagement cap 708 are further configured such that the stud 722 is received within, and in some cases fits securely into the notch 704. When the stud 722 and the notch 704 are so engaged, relative motion between, e.g., rotation or lateral translation of, the hollow body 700 and engagement cap 708 is prevented. Such motion would otherwise arise due to friction between the first and second fork portions 628, 632 of the inner end 624 of the arm 520 and the component pieces of the hollow body assembly 706 as the arm 520 rotates about the axis 619 of the axle 618 (see FIGS. 12-13). This friction would result in a twisting force that could pull the component pieces of the hollow body assembly 706 apart from one another. Other means of preventing relative motion between the component parts of the hollow body 610 instead of or in addition to the stud 722 and the notch 704 may also be used. For example, an adhesive may be applied at the interface 721 of the engagement cap 708 where it contacts the hollow body 700.

The same forces that oppose the friction described above also keep the component pieces of the hollow body assembly 706 from separating from one another. As a result, in some embodiments, the hollow body assembly 706 does not require screws in order to prevent the main housing 700 and the engagement cap 708 from moving away from one another in a direction along the axis 619 of the axle 618, for example during assembly. However, in some embodiments, it may be desirable to provide additional fixation of the hollow body 700 and the engagement cap 708, such as by use of an adhesive at the interface 721 or using fasteners (e.g., screws).

An axle similar to the axle 618 is disposed within the channel 614 of the main housing 700 and within the opening 720 of the engagement cap 708. The axle extends through the opening 720 and through the end of the channel 614 opposite the engagement cap 708. The portions of the axle extending through the end of the channel 614 and the opening 720 are coupled with the first and second fork portions 628, 632 of the inner end 624 of the arm 520. In FIG. 17A, the bottom surface 611 of the engagement cap 708 is disposed at an end of the channel 614 opposite the contact surface 612 of the hollow body 700. The bottom surface 611 is adjacent to the second end 680 of the channel 614.

The contact insert 730 and main body 728 of the first fork portion 628 are configured to lie in planes generally parallel to each other and to the plane of the second fork portion 632. The contact insert 730 is disposed between the main body 728 of the first fork portion 628 and the engagement cap 708 such that the first surface 630 comes into contact with the bottom surface 611 of the engagement cap 708. The contact insert 730 is disposed such that the axle extends through the through hole 738. The contact insert 730 may be fixedly attached to the main body 728. Alternatively, the contact insert 730 may be prevented from moving along the axis of the axle only by forces (e.g., compression) applied by the engagement cap 708. This may be desirable for ease of assembly. Rotational movement of the contact insert 730 about the axis of the axle is limited by the first and second legs 732, 734. The contact insert 730 may be configured such that a distance S between the first and second legs 732, 734 is equal to or larger than the width of the portion of the inner end 624 of the arm 520 between the first and second fork portions 628, 632. The contact insert 730 is configured such that a notch surrounded by the legs, 723, 734 and the first surface 630 is generally in contact with the inner end 624. The first and second legs 732, 734 are generally in contact with faces of arm 520 that are perpendicular to the inner end 624. In this way, the contact insert 730 may be configured so as to fit securely about the arm 520 at the inner end 624.

The complex motion of the arm 520 may be provided by the awning arm assembly 504A in substantially the same manner as described above with respect to FIG. 16A. However, rotation of the arm 520 about the axis 619 of the axle 618 may result in a force in a plane not perpendicular to the axis 619, which can create a load at one or more interfaces within the awning arm assembly 504A. Loads such as these may cause components of the awning arm assembly 520 to become worn down at a faster rate than they would otherwise, eventually to the point of inoperability. For example, the awning arm assembly 504A may experience a load on the end of the hollow body 610 nearest to the first fork portion 628 of the inner end 624 of the arm 520. Consequently, it may be desirable to use wear-resistant materials or components, such as hard metals like stainless steel and composite materials, for the awning arm assembly 504A to protect against those loads. It may further be desirable to use removable component parts so that if one part breaks due to forces such as the one described here, or due to any other wear from use, it would not be necessary to discard the entire awning device or the entire awning arm assembly 504A. Thus, any of the embodiments disclosed herein may be constructed in part or in whole using wear-resistant materials or components so as to prolong the life of the awning arm assembly 504A. Alternatively, it may instead be desirable to use wear-resistant materials for only those portions of the awning arm assembly 504A that will experience the greatest loads. For example, to protect against a load at the end of the hollow body 610 nearest to the first fork portion 628, the engagement cap 708 and the contact insert 730 may be constructed out of a wear-resistant material. Thus, according to one embodiment, the engagement cap 708, the contact insert 730, or both the cap and the insert may be constructed out of a wear-resistant material, for example hard metals such as stainless steel or composite materials. Other portions of the hollow body 610 or hollow body assembly 504A and arm 520 may be constructed out of another, lighter material. Other wear-resistant materials may be used. Different materials may be used for different components. Additionally, such materials may be used at other portions or for other components of the awning arm assembly 504A instead of or in addition to the engagement cap 708 and/or the contact insert 730. Moreover, components such as the engagement cap 708 and/or the contact insert 730 may be removable such that if one or both of these components is broken, it may be replaced with a new one. Other components of the awning arm assembly 504A may also be removable and replaceable in this manner.

FIGS. 17B, 17B-1, and 17B-2 show various features of the engagement cap 708. The engagement cap 708 comprises the bottom surface 611, two walls 710, 712, a receiving zone 718, an elongated opening 720 (shown in FIG. 17B-1), an interface 721, and a stud 722 (shown in FIG. 17B-2). The walls 710, 712 are generally perpendicular to each other and to the bottom surface 611 so as to define, at least partially, the receiving zone 718. The interface 721 is disposed on a side of the engagement cap 708 opposite the walls 710, 712 and nearest to the hollow body 700. The bottom surface 611 may be shaped to include a ramped portion 716. The engagement cap 708 may be shaped so that it tapers at the end terminating with the ramped portion 716, thus providing a wedge.

The engagement cap 708 is disposed adjacent to the hollow body 700 such that a portion of the first fork portion 624 and a portion of the contact insert 730, may be disposed within the receiving zone 718. Rotation of the arm 520 about an axis of an axle thereof may cause the first surface 630 of the contact insert 730 to slide across or rotate over the bottom surface 611. The walls 710, 712 may be shaped so as to provide a continuous sloped edge in order to facilitate the complex motion of the awning arm 520 described above. For example, as illustrated in FIG. 17B-2, an end of the wall 712 farthest from the wall 710 may be angled such that it becomes coplanar with the ramped portion 716 of the bottom surface 611. Such a sloped shape may provide for the above-described complex motion of the awning arm 520 as the arm 520 rotates about the axis of the axle but altering the angle at which the arm 520 is disposed with respect to the hollow body 610.

In some embodiments, the engagement cap 708 is a removable cap. However, as noted above, the engagement cap 708 is just one of many possible wear-resistant components that may be used. In some embodiments, the wear-resistant component may be a surface of the hollow body 610 or hollow body assembly 706. In other embodiments, the wear-resistant component could be another kind of cap or insert. In some embodiments, the wear-resistant component is a wedge. In some embodiments, the wear-resistant component is a removable and/or replacement component.

Figure 17C:
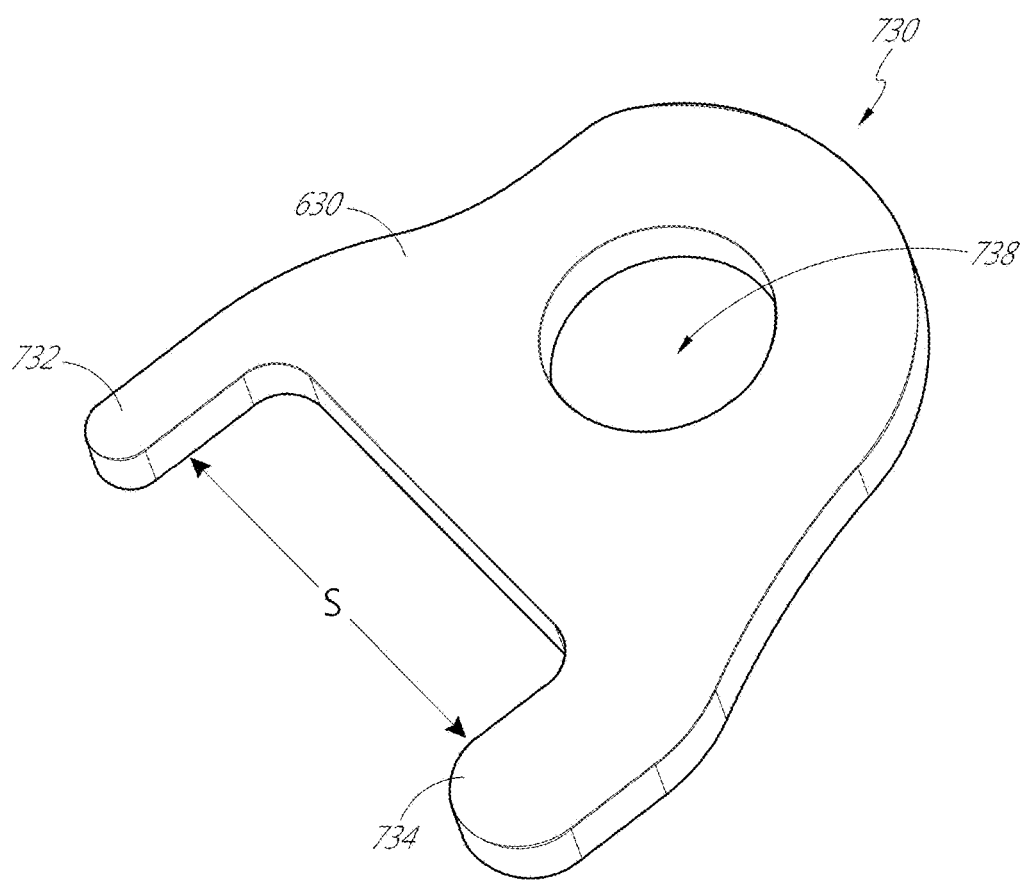
FIG. 17C is a perspective view of a contact insert of the hollow body assembly shown in FIG. 17A.

FIG. 17C shows an embodiment of the contact insert 730 in more detail. The contact insert 730 comprises the first surface 630, a first leg 732, a second leg 734, and a through hole 738. The first and second legs 732, 734 are separated by a distance S. As illustrated, the contact insert 730 is generally flat. As discussed above, the contact insert 730 is configured to engage with the inner end 624 of the arm 520 in a manner that restricts rotational movement of the contact insert 730 about the axis 619 of the axle 618.

As noted above, the features of the joint illustrated in FIGS. 17A-17C may also be implemented into a joint disposed between multiple moving arm components, such as in the arm assembly 112 described above in Part I of this Detailed Description with reference to FIGS. 1A-8. For example, the embodiment illustrated in FIG. 5B includes some features similar to those illustrated in FIGS. 17A-17C. In some embodiments, the features of the joint illustrated in FIGS. 17A-17C may be implemented into both a joint disposed between multiple moving arm components a joint having a stationary end, as described in Part II of this Detailed Description.

III. Awning Arm Assembly Joints Having Features to Reduce Wear

In addition or as an alternative to the use of wear-resistant components as described above, awning arm assembly joints may be configured so as to reduce wear on and/or to extend the life of the components. For example features may be incorporated into the design of an awning arm assembly joint in order to reduce contact wear between components of the joint or other failure modes.

FIGS. 18 and 19 illustrate an embodiment of a joint 800 that may be incorporated in an awning arm assembly, such as those previously described. The joint 800 is generally similar to the joints previously described, such as the joint 128 (shown in, for example, FIGS. 6 and 7), the joint 128' (shown in, for example, FIG. 5B), and/or the joint 620 (shown in, for example, FIGS. 11 and 17A). The embodiment of FIGS. 18 and 19 can be implemented as a modification of the embodiments of FIGS. 1A-8, FIGS. 9-16B, FIGS. 17A-17C, or with other embodiments described herein. Some of the features of the joint 800 will be discussed again here; however, it will be understood that other features previously described may be included in the embodiment shown in FIG. 18.

As shown in FIGS. 18 and 19, the joint 800 includes a first arm end member 808, a second arm end member 804, and a hollow body 824. The second arm end member 804 may include a multi-pronged end 812. The multi-pronged end 812 may include a central connecting portion 816, a first and a second fork portion 820, 828, one or more rollers 836, 840, and one or more axles 832. The hollow body 824 includes a top surface 860 and a bottom surface 864. The hollow body 824 may be configured so that it is disposed on the central connecting portion 816 of the multi-pronged end 812 of the second arm end member 804. The top and bottom surfaces 860, 864 of the hollow body 824 may be substantially parallel to one another. The first arm end member 808 may have a receiving portion 844 and an axle 856. In the embodiment illustrated in FIGS. 18 and 19, the receiving portion 844 has an upper and lower lobe 846, 850. One or both of the lobes 846, 850 may have a guide surface for contacting another component of the joint, the guide surface(s) disposed at an outer perimeter of the lobe. In the embodiment of FIGS. 18 and 19, the lobes 846, 850 each have a guide surface 848, 852, respectively. The upper lobe 846 also has a bottom surface 868. The lower lobe 852 may have a top surface 872 and may also have a facet 876 on the guide surface 852.

As shown in FIGS. 18 and 19, the first fork portion 820, the central connecting portion 816, and the second fork portion 828 may lie in the same plane or in planes that are substantially parallel to one another. The axle 832 may be disposed substantially perpendicularly to the first fork portion 820, the central connecting portion 816, and/or the second fork portion 828. The axle 832 may be disposed such that a center portion of the axle 832 passes through a channel (not shown) in the central connecting portion 816, and the two ends of the axle 832 are disposed in cavities in the first and second fork portions 820, 828. In some embodiments, the channel in the central connecting portion 816 and cavities in the first and second fork portions 820, 828 may be configured such that the axle 832 may freely rotate about its longitudinal axis. In a modified embodiment, two axles 832 can be provided one disposed between the first fork portion 820 and the central connecting portion 816 and one disposed between the second fork portion 828 and the central connecting portion 816. The axle 832 or axles 832 can be fixed but configured for smooth pivoting of the roller 836 thereabout. The first fork portion 820, the central connecting portion 816, and the second fork portion 828 may be spaced such that the rollers 836, 840 are disposed on the axle 832 (or axles 832) between the first fork portion 820 and the central connecting portion 816, and between the central connecting portion 816 and the second fork portion 828, respectively. The rollers 836, 840 may be configured such that they are permitted to rotate freely about the axle 832. The rollers 836, 840 may be configured such that they are fixed to and freely rotate with the axle 832 (or axles 832). In some embodiments, the rollers 836, 840 may be fixed such that there is no relative movement between the axle 832 and the rollers 836, 840. In some embodiments, the rollers 836, 840 may be fixed to the axle 832 as the axle 832 rotates about its longitudinal axis. In some embodiments, one or both of the guide surfaces 848, 852 of the upper and lower lobes 846, 850 may have a feature such as the facet 876 shown in FIGS. 18 and 19.

As shown in FIGS. 18 and 19, the hollow body 824 may be disposed between the upper and lower lobes 846, 850 of the first arm end member 808. The hollow body 824 may have a channel with further details and features substantially similar to those described above. The axle 856 may be disposed along an axis that is substantially perpendicular to the upper and lower lobes 846, 850 and the hollow body 824. The axle 856 may be disposed such that a center portion of the axle 856 passes through a channel (not shown) in the hollow body 824. The ends of the axle 856 can be disposed in cavities in the upper and lower lobes 846, 850. In some embodiments, the upper and lower lobes 846, 850 may be wedge-shaped. FIG. 19A shows the wedge shape of the upper lobe 846 in greater detail. For example, the upper lobe 846 may have a top surface that is substantially parallel to a longitudinal axis of the first arm end member 808. The lower lobe 850 may have a bottom surface that is substantially parallel to a longitudinal axis of the first arm end member 808. The bottom surface 868 of the upper lobe 846 may be disposed at an acute angle A with the top surface of the upper lobe 846. The angle A is shown in FIG. 19A as being between the dashed lines. The top dash line corresponds to the top surface of the upper lobe 846. The lower dash line corresponds to the lower surface of the upper lobe. Additionally or alternatively, the top surface 872 of the lower lobe 850 may be disposed at an acute angle with the bottom surface of the lower lobe 850. In some embodiments, one or both of the bottom surface 868 of the upper lobe 846 and the top surface 872 of the lower lobe 850 may be disposed at an acute angle (e.g., between 0 and 90 degrees, preferably between 10 and 70 degrees, and more preferably between 20 and 60 degrees) with respect to the top surface of the upper lobe 846 and the bottom surface of the lower lobe 850, respectively. Additionally or alternatively, one or both of the bottom surface 868 of the upper lobe 846 and the top surface 872 of the lower lobe 850 may be disposed at an acute angle with respect to an axis of the axle 856. For example, one or both of the bottom surface 868 of the upper lobe 846 and the top surface 872 of the lower lobe 850 may be disposed at an angle between 0 and 90 degrees, preferably between 45 and 85 degrees, and more preferably between 65 and 85 degrees with respect to the axis of the axle 856. The bottom surface 868 of the upper lobe 846 and the top surface 872 of the lower lobe 850 may disposed at an acute angle with respect to either of the an axis of the first arm end member 808 and/or an axis of the axle 856 that is different from the angle of the other of the bottom surface 868 of the upper lobe 846 and the top surface 872 of the lower lobe 850. The bottom surface 868 of the upper lobe 846 and the top surface 872 of the lower lobe 850 may be configured such that the second arm end member 804 moves relative to the first arm end member 808 in a plane parallel to the axis of the axle 856 as an angle between the second arm end member 804 and the first arm end member 808 is adjusted in a plane perpendicular to the axis of the axle 856. During this motion, the hollow body 824 may tilt with respect to the axle 856 as the second arm end member 804 rotates about the axle 856 with respect to the first arm end member 808.

In addition to disposing the bottom surface 868 of the upper lobe 846 and/or the top surface 872 of the lower lobe 850 at an angle to other surfaces of the upper and lower lobes 846, 850, e.g., to surfaces that are parallel to a longitudinal axis of the first arm end member arm 808, further features may be incorporated into the joint 800 to allow for the complex motion of an arm of an awning arm assembly. In some embodiments, the joint 800 may include features similar to those described above. For example, the joint 800 can include features similar to those described above with respect to the joint 128 or the joint 128', as illustrated in FIGS. 2-8. As noted above, this complex motion may be defined by a tilting of the hollow body 824 relative to the axle 856 as the joint is opened or closed.

Various components of the joint 800 may come into sliding contact with one another during opening or closing of the joint 800. For example, the bottom surface 868 of the upper lobe 846 may be in sliding contact with the top surface 860 of the hollow body 824 during at least a portion of the time that the joint 800 is being opened or closed. Additionally or alternatively, the top surface 872 of the bottom lobe 850 may be in sliding contact with the bottom surface 864 of the hollow body 824. This sliding contact may contribute to wear of the components of the joint 800. Thus, it may be desirable to include one or more features to reduce the contact between these components or to lessen contact-based wear of any of the components of the joint 800. Thus, according to some embodiments, the joint 800 may include one or more rollers 836, 840. One or both of the rollers 836, 840 may be in rolling contact with the guide surfaces 848, 852 of the upper and lower lobes 846, 450, respectively, as the joint 800 moves from an open configuration to a closed configuration or vice versa. The first and second fork portions 820, 828 of the second arm end member 804 and the position of the axle 832 may be configured such that contact or contact-based wear is reduced between the surfaces of the hollow body 824 and the upper and lower lobes 846, 850.

Other features providing for rolling contact between the second and first arm end members 804, 808 may be used in place of the rollers 836, 840 to guide motion of the components of the joint 800 during opening or closing. Additionally, in some embodiments, the joint 800 may only have a single roller. For example, in some embodiments the joint 800 may have the roller 840 and may omit the roller 836. In some embodiments the joint 800 may have the roller 836 and may omit the roller 840. In embodiments where both rollers 836, 840 are present, such as that illustrated in FIGS. 18 and 19, only one of the rollers 836, 840 may be in contact with the guide surfaces 848, 852 at a given time. For example, the roller 836 may only be in contact with the guide surface 848 of the upper lobe 846 when the joint 800 is in a closed configuration. When one or both of the rollers 836, 840 is present, friction between the bottom surface 868 of the upper lobe 846 and the top surface 860 of the hollow body 824, and between the top surface 872 of the lower lobe 850 and the bottom surface 864 of the hollow body 824, may be reduced.

The joint 800 may permit complex motion between different portions of an awning arm assembly substantially as described above. As shown in FIGS. 18-19A and described above, providing an acute angle between the bottom surface 868 of the upper lobe 846 and the top surface of the upper lobe 846 and/or an axis of the axle 856, and/or between the top surface 872 of the lower lobe 850 and the bottom surface of the lower lobe 850 and/or an axis of the axle 856, may cause an angle between the second and first arm end members 804, 808 to be adjusted as relative movement is provided between the members. The angle adjustment can be in a direction parallel to the axis of the axle 856 when the joint is opened or closed. In embodiments such as that shown in FIGS. 18 and 19, the rollers 836, 840 may bear the weight of the portion of the awning arm assembly extending from the second arm end member 804 in order to reduce sliding contact during opening or closing of the joint 800. In some embodiments, one or more guide surfaces similar to the guide surfaces 848, 852 of the upper and lower lobes 846, 850 may be disposed at an acute angle with respect to the planes of the lobes 846, 850, respectively (e.g., an angle between 0 and 90 degrees, preferably between 45 and 90 degrees, more preferably between 70 and 90 degrees) such that an angle between second and first arm end members 804, 808 is adjusted in a direction along, e.g., parallel to, the axis of the axle 856 as one or more rollers travel over them when the joint is opened or closed. In these embodiments, rollers similar to the rollers 836, 840 may not only bear weight but also cause the complex motion of the joint.

In some embodiments, the features providing rolling contact between the second and first arm end members 804, 808 may be disposed on the first arm end member 808. In such embodiments, the first arm end member may include one or more guide surfaces. For example, in some embodiments, one or more rollers similar to the rollers 836, 840 may be disposed on the second arm end member while one or more guide surfaces similar to the guide surfaces 848, 852 may be disposed on the second arm end member 804.

As noted above, features of the joint 800 may be implemented into other awning arm systems as described herein. For example, the joint 800 may be implemented in an awning arm apparatus either as a joint disposed between multiple moving arm components (as just described, or as in the arm assembly 112 described above in Part I of this Detailed Description with reference to FIGS. 1A-8), or as a joint having a stationary end (e.g., disposed adjacent to a mounting surface as described in Part II of this Detailed Description, such as the embodiments described with reference to FIGS. 9-16B or FIGS. 17A-17C). In some embodiments, the features of the joint 800 may be implemented into both a joint disposed between multiple moving arm components and a joint having a stationary end. As is apparent from this application, the stationary end is to be understood as an end that does not move relative to a structure to which the end is coupled not that the stationary end is immobilized in an absolute sense. For example, the stationary end may be coupled with a mobile vehicle as in FIG. 1 and thus not immobilized. The joint 800 may also be modified to include wear resistant components similar to those described above with respect to FIGS. 5B or 17A-17C.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. An awning arm assembly comprising:
    an arm having an inner end and an outer end; and
    a joint comprising a single axle coupled with the arm and a hollow body disposed about the axle and configured to be coupled with another component of the awning assembly in a manner providing no relative movement between the hollow body and the other component of the assembly with which the hollow body is coupled, the joint also comprising a rolling guide journaled about an axis that is coupled in a fixed relation with the hollow body;
    wherein motion of the rolling guide is controlled by a contact surface of the joint and the hollow body is coupled with the axle such that when the arm moves relative to the other component the angle between the arm and the other component in each of two planes is adjusted such that the movement of the arm is in at least two directions about the single axle.

2. The awning arm assembly of claim 1, wherein the arm comprises an inner arm and the other component comprises an outer arm having an inner end and an outer end the hollow body being coupled with the inner end of the outer arm.

3. The awning arm of claim 1, wherein the hollow body is configured to permit the hollow body to tilt relative to the axle such that a larger angle is provided between the hollow body and the axle in an extended position than is provided between the hollow body and the axle in a retracted position.

4. The awning arm assembly of claim 1, wherein the contact surface comprises an exposed face of a fork portion of the joint.

5. The awning arm assembly of claim 1, wherein a control surface is disposed adjacent to the axle to guide the motion of the rolling guide.

6. The awning arm assembly of claim 5, wherein the control surface comprises a wear resistant structure disposed thereon.

7. An awning arm assembly comprising:
an arm having an inner end and an outer end; and
a joint comprising a single axle coupled with the arm and a hollow body disposed about the axle and configured to be coupled with another component of the awning assembly in a manner providing no relative movement between the hollow body and the other component of the assembly with which the hollow body is coupled, the joint also comprising a rolling guide journaled about an axis that is coupled in a fixed relation with the hollow body;
wherein motion of the rolling guide is controlled by a contact surface of the joint and the hollow body is coupled with the axle such that when the arm moves relative to the other component the angle between the arm and the other component in each of two planes is adjusted such that the movement of the arm is in at least two directions about the single axle;
wherein the rolling guide is a first rolling guide disposed at a first elevation of the joint and further comprising a second rolling guide disposed at a second elevation of the joint, the second elevation being disposed above the first elevation.

8. An awning arm joint, comprising:
an arm end member comprising a first portion and a second portion;
an axle coupled with the first portion and the second portion;
a hollow body defining a channel disposed about the axle;
a guide surface disposed adjacent to the axle or to the hollow body; and
a rolling guide in contact with the guide surface;
wherein as the arm joint unfolds from a folded state rolling contact between the rolling guide and the guide surface causes the hollow body to rotate about and tilt relative to the axle;
wherein each of the first and second portions of the arm end member comprises a contact surface in sliding contact with corresponding surfaces of the hollow body such that as the awning arm joint unfolds from a folded state, the sliding contact surfaces cause the hollow body to rotate about and tilt relative to the axle;
wherein the rolling contact between the rolling guide and the guide surface supports and guides the sliding contact between the hollow body and the contact surfaces through both the rotation and tilting of the hollow body relative to the axle.

9. The awning arm joint of claim 8, wherein the guide surface is disposed on the first portion and the first portion is disposed at an elevation below the second portion.

10. The awning arm joint of claim 8, wherein the rolling guide is journaled about an axis that is fixed relative to the hollow body.

11. The awning arm joint of claim 8, wherein the channel comprises a first end and a second end, the channel being wider at the first and second ends than at a point along the channel between the first and second ends.

12. The awning arm joint of Claim 8, wherein the contact surfaces are disposed at an angle with respect to a longitudinal axis of the second arm end member, the angle being between 0 and 90 degrees.

13. The awning arm joint of claim 8, wherein the joint further comprises a second arm end member, the second arm end member comprising the hollow body and the rolling guide.

14. The awning arm joint of claim 13, wherein the second arm end member further comprises a first fork portion, a second fork portion, and a second axle, the second axle being disposed between the first fork portion and the second fork portion.

15. The awning arm joint of claim 14, wherein the rolling guide is disposed on the second axle of the second arm end member.

16. An awning arm joint, comprising:
an arm end member comprising a first portion and a second portion;
an axle coupled with the first portion and the second portion;
a hollow body defining a channel disposed about the axle;
a guide surface disposed adjacent to the axle or to the hollow body; and
a rolling guide in contact with the guide surface;
wherein as the arm joint unfolds from a folded state rolling contact between the rolling guide and the guide surface causes the hollow body to rotate about and tilt relative to the axle;
wherein the rolling guide comprises a first rolling guide and further comprising a second rolling guide, the guide surface comprises a first guide surface and further comprising a second guide surface, the first rolling guide being in contact with the first guide surface and the second rolling guide being in contact with the second guide surface.

17. The awning arm joint of claim 16, wherein the second guide surface comprises a surface of the second portion.

18. The awning arm joint of claim 16, wherein the first rolling guide and the second rolling guide are journaled about a common axis.

* * * * *

UNITED STATES PATENT AND TRADEMARK OFFICE
CERTIFICATE OF CORRECTION

PATENT NO. : 10,428,549 B2
APPLICATION NO. : 15/476766
DATED : October 1, 2019
INVENTOR(S) : Zhun-An Ma Page 1 of 1

It is certified that error appears in the above-identified patent and that said Letters Patent is hereby corrected as shown below:

In the Claims

In Column 29 at Line 1, In Claim 3, after "arm" insert --assembly--.

Signed and Sealed this
Twenty-first Day of January, 2020

Andrei Iancu
*Director of the United States Patent and Trademark Office*